(12) United States Patent
Takahashi

(10) Patent No.: US 11,950,024 B2
(45) Date of Patent: Apr. 2, 2024

(54) REMOTE OPERATION SYSTEM, REMOTE OPERATION METHOD, AND PROGRAM

(71) Applicant: TOYOTA JIDOSHA KABUSHIKI KAISHA, Toyota (JP)

(72) Inventor: Masahiro Takahashi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 17/698,414

(22) Filed: Mar. 18, 2022

(65) Prior Publication Data
US 2022/0311976 A1   Sep. 29, 2022

(30) Foreign Application Priority Data

Mar. 23, 2021   (JP) .................. 2021-049224

(51) Int. Cl.
| H04N 7/18 | (2006.01) |
| H04N 7/04 | (2006.01) |
| H04N 23/66 | (2023.01) |
| H04R 1/02 | (2006.01) |
| H04R 1/08 | (2006.01) |
| H04W 4/029 | (2018.01) |

(52) U.S. Cl.
CPC .............. *H04N 7/183* (2013.01); *H04N 7/04* (2013.01); *H04N 23/66* (2023.01); *H04R 1/028* (2013.01); *H04R 1/08* (2013.01); *H04W 4/029* (2018.02)

(58) Field of Classification Search
CPC .......... H04N 7/183; H04N 23/66; H04N 7/04; H04N 7/18; H04W 4/029; H04R 1/028; H04R 1/08
See application file for complete search history.

(56) References Cited

U.S. PATENT DOCUMENTS

| 2011/0288682 A1* | 11/2011 | Pinter ................... B25J 9/1689 |
| | | 700/259 |
| 2018/0373239 A1* | 12/2018 | Tsubota ................. B25J 11/008 |

(Continued)

FOREIGN PATENT DOCUMENTS

| JP | 5070441 B2 | 11/2012 |
| JP | 2017-169839 A | 9/2017 |
| JP | 2019-005819 A | 1/2019 |

*Primary Examiner* — Olisa Anwah
(74) *Attorney, Agent, or Firm* — Dinsmore & Shohl LLP

(57) ABSTRACT

Each remote operation terminal includes an own robot sound pressure information transmission unit, an own robot sound pressure information reception unit, an another terminal sound pressure information transmission unit, an another terminal sound pressure information reception unit, a sound pressure information output unit configured to output sound pressure information received by the own robot sound pressure information reception unit or the other terminal sound pressure information reception unit, and a conversation control unit configured to execute an inter-robot conversation mode that establishes conversation with another user using the own robot sound pressure information transmission unit and the own robot sound pressure information reception unit and an inter-terminal conversation mode that establishes conversation with another user using the other terminal sound pressure information transmission unit and the other terminal sound pressure information reception unit in such a way that they can be switched.

5 Claims, 11 Drawing Sheets

(56) References Cited

U.S. PATENT DOCUMENTS

2020/0130194 A1* 4/2020 Yamamoto ........... G05D 1/0016
2020/0398432 A1* 12/2020 Tan ........................ B25J 11/001
2023/0208894 A1* 6/2023 Litsuka ............... H04L 65/4015
                                                    709/204

* cited by examiner

| USER NAME | ROBOT ID |
|---|---|
| USER B | 8231 |
| USER D | 3954 |
| USER R | 3847 |
| USER Z | 18273 |

Fig. 3

| ROBOT ID | CURRENT LOCATION |
|---|---|
| 8231 | 35.0841779957118, 138.8571869813099 |
| 2341 | 35.0841028235685, 138.8568945697484 |

Fig. 4

REMOTE OPERATION SYSTEM, REMOTE OPERATION METHOD, AND PROGRAM

CROSS REFERENCE TO RELATED APPLICATIONS

This application is based upon and claims the benefit of priority from Japanese patent application No. 2021-49224, filed on Mar. 23, 2021, the disclosure of which is incorporated herein in its entirety by reference.

BACKGROUND

The present disclosure relates to a remote operation system, a remote operation method, and a program.

Patent Literature 1 (Japanese Patent No. 5070441) discloses a robot that can be remotely operated using an operation terminal.

SUMMARY

Incidentally, when a plurality of users who are present in locations away from each other remotely operate a plurality of respective remote operation robots that are present in one place by operating respective remote operation terminals that these users have, they may want to enjoy talking to each other.

If a plurality of remote operation robots are located in a noisy environment, however, it is difficult for the plurality of users to talk to each other via these plurality of remote operation robots.

The aim of the present disclosure is to provide a technique for enabling a plurality of users who are present in locations away from each other to achieve a clear conversation between them when they remotely operate a plurality of respective remote operation mobile bodies that are located in one place by operating respective remote operation terminals that the plurality of users have.

According to a first aspect of the present application, a remote operation system in which a plurality of users who are present in locations away from each other remotely operate a plurality of respective remote operation mobile bodies that are located in one place by operating respective remote operation terminals that the plurality of users have, the remote operation system including: the plurality of remote operation mobile bodies; and the plurality of remote operation terminals, in which each of the remote operation mobile bodies includes: a control command reception unit configured to receive a control command from the corresponding remote operation terminal; an operation control unit configured to control the operation of the own remote operation mobile body based on the control command; an imaging unit; a captured image information acquisition unit configured to acquire captured image information from the imaging unit; a captured image information transmission unit configured to transmit the captured image information to the corresponding remote operation terminal; a mobile-body-side microphone; a mobile-body-side sound pressure information acquisition unit configured to acquire sound pressure information from the mobile-body-side microphone; a mobile-body-side sound pressure information transmission unit configured to transmit the sound pressure information acquired by the mobile-body-side sound pressure information acquisition unit to the corresponding remote operation terminal; a mobile-body-side sound pressure information reception unit configured to receive sound pressure information from the corresponding remote operation terminal; and a mobile-body-side output unit configured to output the sound pressure information received by the mobile-body-side sound pressure information reception unit, and each of the remote operation terminals includes: a control command input unit configured to accept an operation of inputting the control command; a control command transmission unit configured to transmit the control command to the corresponding remote operation mobile body; a captured image information reception unit configured to receive the captured image information from the corresponding remote operation mobile body; a captured image information display unit configured to display the captured image information; a terminal-side microphone; a terminal-side sound pressure information acquisition unit configured to acquire sound pressure information from the terminal-side microphone; a first-terminal-side sound pressure information transmission unit configured to transmit the sound pressure information acquired by the terminal-side sound pressure information acquisition unit to the corresponding remote operation mobile body; a first-terminal-side sound pressure information reception unit configured to receive sound pressure information from the corresponding remote operation mobile body; a second-terminal-side sound pressure information transmission unit configured to transmit the sound pressure information acquired by the terminal-side sound pressure information acquisition unit to another remote operation terminal; a second-terminal-side sound pressure information reception unit configured to receive sound pressure information from another remote operation terminal; a terminal-side output unit configured to output the sound pressure information received by the first-terminal-side sound pressure information reception unit or the second-terminal-side sound pressure information reception unit; and a conversation control unit configured to execute an inter-mobile-body conversation mode that establishes conversation with another user using the first-terminal-side sound pressure information transmission unit and the first-terminal-side sound pressure information reception unit and an inter-terminal conversation mode that establishes conversation with another user using the second-terminal-side sound pressure information transmission unit and the second-terminal-side sound pressure information reception unit in such a way that they can be switched is provided. According to the aforementioned configuration, when a plurality of users who are present in locations away from each other remotely operate a plurality of respective remote operation mobile bodies that are present in one place by operating respective remote operation terminals that these users have, a clear conversation between the plurality of users is achieved. Furthermore, a realistic user experience in which environmental sounds are mixed with the user's voice and a clear conversation without environmental sounds mixed with the user's voice can be achieved in such a way that they can be switched.

Each of the remote operation mobile bodies may further include: an own body identification information storage unit configured to store body identification information of the own remote operation mobile body; a current location information acquisition unit configured to acquire current location information of the own remote operation mobile body; an identification location information transmission unit configured to transmit identification location information including the body identification information and the current location information to another remote operation mobile body; an another body identification information storage unit configured to store body identification information of a remote operation mobile body of a user who has a relation with the user who corresponds to the own remote operation mobile body; an identification location information reception unit configured to receive the identification location information from another remote operation mobile body; a related mobile body presence information generation unit configured to generate related mobile body presence information indicating that the remote operation mobile body of the user who has a relation with the user who corresponds to the own remote operation mobile body is close to the own remote operation mobile body based on the body identification information stored in the other body identification information storage unit, the identification location information received by the identification location information reception unit, and the current location information acquired by the current location information acquisition unit; and a related mobile body presence information transmission unit configured to transmit the related mobile body presence information to the corresponding remote operation terminal, and each of the remote operation terminals may include: a related mobile body presence information reception unit configured to receive the related mobile body presence information from the corresponding remote operation mobile body; and a related mobile body presence information display unit configured to display the related mobile body presence information. According to the aforementioned configuration, it is possible to easily know that the remote operation mobile body of the user who has a relation is close to the own remote operation mobile body.

Each of the remote operation terminals may further include: an inter-terminal conversation request transmission unit configured to transmit an inter-terminal conversation request to another remote operation terminal; an inter-terminal conversation request reception unit configured to receive an inter-terminal conversation request from another remote operation terminal; and an inter-terminal conversation request approval unit configured to accept an operation of approving the inter-terminal conversation request received from another remote operation terminal, and the conversation control unit of each of the remote operation terminals executes the inter-terminal conversation mode in place of the inter-mobile-body conversation mode after the inter-terminal conversation request is approved. According to the aforementioned configuration, the inter-terminal conversation mode can be executed with a high security.

Each of the remote operation terminals may further include: a conversation partner selection unit configured to accept an operation of selecting at least one remote operation mobile body from at least one remote operation mobile body shown in the captured image information displayed by the captured image information display unit, and the inter-terminal conversation request transmission unit transmits the inter-terminal conversation request to the remote operation terminal that corresponds to the at least one remote operation mobile body that has been selected. According to the aforementioned configuration, it is possible to intuitively select the other remote operation mobile body to which the inter-terminal conversation request is transmitted.

The operation control unit may control the operation of the own remote operation mobile body in such a way that the own remote operation mobile body moves following the remote operation mobile body that corresponds to the remote operation terminal that has transmitted the inter-terminal conversation request while the conversation control unit of the corresponding remote operation terminal is executing the inter-terminal conversation mode. According to the aforementioned configuration, the own remote operation mobile body moves following the remote operation mobile body which is having a conversation with the own remote operation mobile body while the inter-terminal conversation mode is being executed.

Each of the remote operation mobile bodies may include: a current location information acquisition unit configured to acquire current location information of the own remote operation mobile body; and a current location information transmission unit configured to transmit the current location information to the corresponding remote operation terminal, each of the remote operation terminals includes: an own body current location information reception unit configured to receive the current location information from the corresponding remote operation mobile body; an own body current location information transmission unit configured to transmit the current location information received by the own body current location information reception unit to another remote operation terminal; and an another body current location information reception unit configured to receive current location information of another remote operation mobile body from the other remote operation terminal, and the terminal-side output unit calculates the distance between remote operation mobile bodies that correspond to the respective users talking to each other based on the current location information of the own remote operation mobile body received by the own body current location information reception unit and the current location information of the other remote operation mobile body received by the other body current location information reception unit while the conversation control unit is executing the inter-terminal conversation mode, and decreases an amplification rate of the sound pressure information when the sound pressure information is output as the calculated distance becomes longer. According to the aforementioned configuration, it is possible to provide a realistic user experience.

According to a second aspect of the present disclosure, a remote operation method in which a plurality of users who are present in locations away from each other remotely operate a plurality of respective remote operation mobile bodies that are located in one place by operating respective remote operation terminal, in which each of the remote operation mobile bodies receives a control command from the corresponding remote operation terminal, each of the remote operation mobile bodies controls the operation of the own remote operation mobile body based on the control command, each of the remote operation mobile bodies acquires captured image information from an imaging unit, each of the remote operation mobile bodies transmits the captured image information to the corresponding remote operation terminal, each of the remote operation mobile bodies acquires sound pressure information from a mobile-body-side microphone, each of the remote operation mobile bodies transmits the acquired sound pressure information to the corresponding remote operation terminal, each of the remote operation mobile bodies receives sound pressure information from the corresponding remote operation terminal, each of the remote operation mobile bodies outputs the received sound pressure information, each of the remote operation terminals accepts an operation of inputting the control command, each of the remote operation terminals transmits the control command to the corresponding remote operation mobile body, each of the remote operation terminals receives the captured image information from the corresponding remote operation mobile body, each of the remote operation terminals displays the captured image information, each of the remote operation terminals acquires sound pressure information from a terminal-side microphone, each of the remote operation terminals transmits the acquired sound pressure information to the corresponding remote operation mobile body, each of the remote operation terminals receives sound pressure information from the corresponding remote operation mobile body, each of the remote operation terminals transmits the acquired sound pressure information to another remote operation terminal, each of the remote operation terminals receives sound pressure information from another remote operation terminal, each of the remote operation terminals outputs the received sound pressure information, and each of the remote operation terminals executes an inter-mobile-body conversation mode in which conversation with another user is established by transmitting the acquired sound pressure information to the corresponding remote operation mobile body and receiving sound pressure information from the corresponding remote operation mobile body, and an inter-terminal conversation mode in which conversation with another user is established by transmitting the acquired sound pressure information to another remote operation terminal and receiving sound pressure information from another remote operation terminal in such a way that the modes can be switched is provided. According to the above method, when a plurality of users who are present in locations away from each other remotely operate a plurality of respective remote operation mobile bodies that are present in one place by operating respective remote operation terminals that these users have, a clear conversation between the plurality of users is achieved. Furthermore, a realistic user experience in which environmental sounds are mixed with the user's voice and a clear conversation without environmental sounds mixed with the user's voice can be achieved in such a way that they can be switched.

A program for causing a computer to execute the above remote operation method is provided.

The present disclosure enables a plurality of users who are present in locations away from each other to achieve a clear conversation between them when they remotely operate a plurality of respective remote operation mobile bodies that are located in one place by operating respective remote operation terminals that the plurality of users have.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a diagram illustrating the content stored in an another robot identification information storage unit;

FIG. 4 is a diagram illustrating identification location information received by an identification location information reception unit;

DESCRIPTION OF EMBODIMENTS

In the midst of the spread of coronavirus, various remote services have been launched. Among them, particular attention has been paid to a remote sightseeing tour, which is a combination of a remote service and sightseeing. The remote sightseeing tour is achieved, for example, by a plurality of users who are present in locations away from each other remotely operating a plurality of respective remote operation robots that are present in one place by operating respective remote operation terminals that the respective users have. Each of the remote operation robots typically includes a microphone and a speaker, which enables the plurality of users to talk to each other via their respective remote operation terminals and the remote operation robots. In this case, each user can hear not only speeches made by the other users but also environmental sounds around the remote operation robot that this user is remotely operating, which allows each user to feel as if he/she is actually sightseeing at the tourist spot.

However, when the remote operation robot that this user is remotely operating is in a noisy environment, speeches made by the other users are drowned out by the environmental sounds. In this case, it becomes difficult for each user to talk to the other users.

The present disclosure has been made in view of the aforementioned problem and provides a technique capable of enabling a plurality of users who are present in locations away from each other to achieve a clear conversation between them when they remotely operate a plurality of respective remote operation mobile bodies that are located in one place by operating respective remote operation terminals that the plurality of users have.

Specifically, when the remote operation robot that this user is remotely operating is in a noisy environment, the users directly exchange voice data between the own remote operation terminal and the remote operation terminal of another user, which prevents the speeches made by other users from being drowned out by the environmental sounds.

In the following, with reference to FIGS. 1 to 12, embodiments of the present application will be described.

Figure 1:
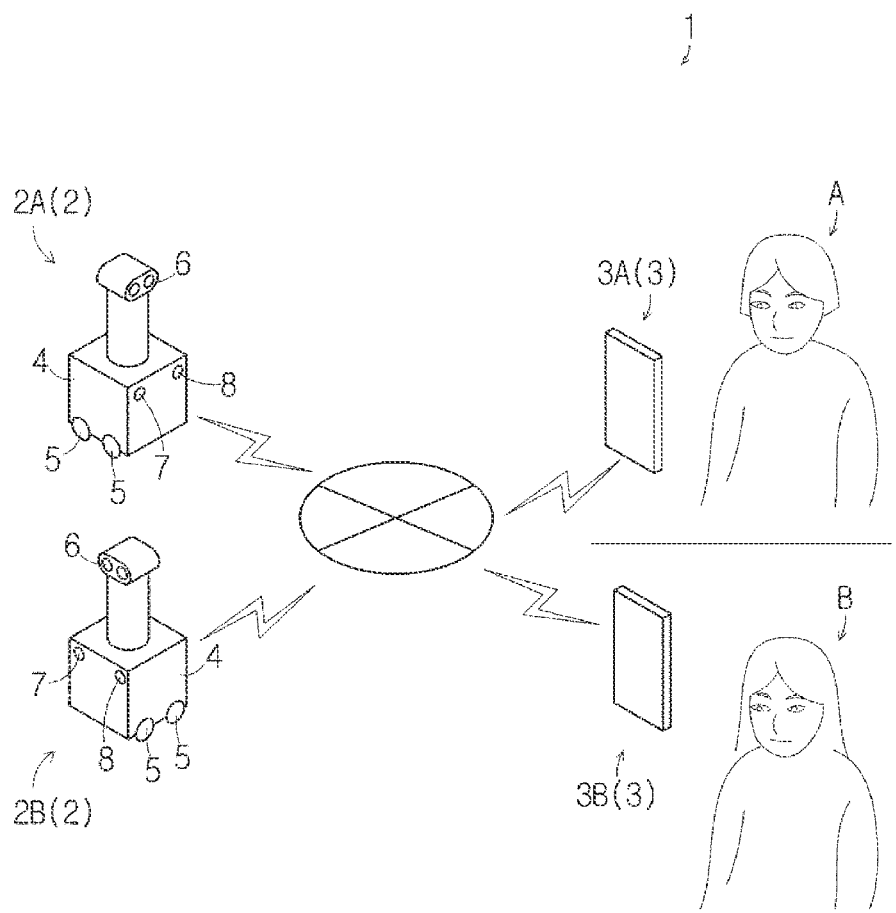
FIG. 1 is a diagram showing a schematic view of a remote sightseeing system.

FIG. 1 shows a remote sightseeing system 1. The remote sightseeing system 1 is one specific example of a remote operation system.

The remote sightseeing system 1 includes a plurality of remote operation robots 2 and a plurality of remote operation terminals 3.

In this embodiment, the plurality of remote operation robots 2 include a remote operation robot 2A and a remote operation robot 2B. The plurality of remote operation robots 2 may include three or more remote operation robots 2.

The remote operation robot 2A and the remote operation robot 2B are located in the same place. That is, the remote operation robot 2A and the remote operation robot 2B are located in the same tourist spot. Typically, the remote operation robot 2A and the remote operation robot 2B are close enough to visually check each other.

In this embodiment, the plurality of remote operation terminals 3 include a remote operation terminal 3A and a remote operation terminal 3B. The plurality of remote operation terminals 3 may include three or more remote operation terminals 3.

The remote operation terminal 3A, which is a terminal that a user A has, is typically a smartphone or a laptop computer that a user A has. The remote operation terminal 3B, which is a terminal that the user B has, is typically a smartphone or a laptop computer that the user B has.

The users A and B typically participate in the same remote sightseeing tour. The users A and B are located away from each other. Typically, the users A and B are far enough away from each other that they cannot visually recognize each other. Therefore, the users A and B cannot directly talk to each other without using electronic equipment.

The remote operation terminal 3A, the remote operation terminal 3B, the remote operation robot 2A, and the remote operation robot 2B are configured in such a way that they can communicate with one another via a Wide Area Network (WAN) such as the Internet. However, the remote operation terminal 3A, the remote operation terminal 3B, the remote operation robot 2A, and the remote operation robot 2B may be configured in such a way that they can communicate with one another via a remote sightseeing server (not shown) connected to the WAN.

The user A remotely operates the remote operation robot 2A by operating the remote operation terminal 3A. Likewise, the user B remotely operates the remote operation robot 2B by operating the remote operation terminal 3B.

The users A and B are able to talk to each other via the remote operation terminal 3A, the remote operation terminal 3B, the remote operation robot 2A, and the remote operation robot 2B. Further, the users A and B are able to talk to each other via the remote operation terminal 3A and the remote operation terminal 3B at a desired timing. Accordingly, the users A and B are able to visually sightsee the same tourist spot together.

(Remote Operation Robot 2)

The remote operation robot 2 is one specific example of a remote operation mobile body. As shown in FIG. 1, the remote operation robot 2 includes a robot body 4, a plurality of wheels 5, a camera 6, a microphone 7, and a speaker 8. The plurality of wheels 5 include a driving wheel and a training wheel. Alternatively, all the plurality of wheels 5 may be driving wheels. The camera 6 is one specific example of an imaging unit. In this embodiment, the camera 6 is a stereo camera having a distance measuring function. However, the camera 6 may not have a distance measuring function.

Figure 2:
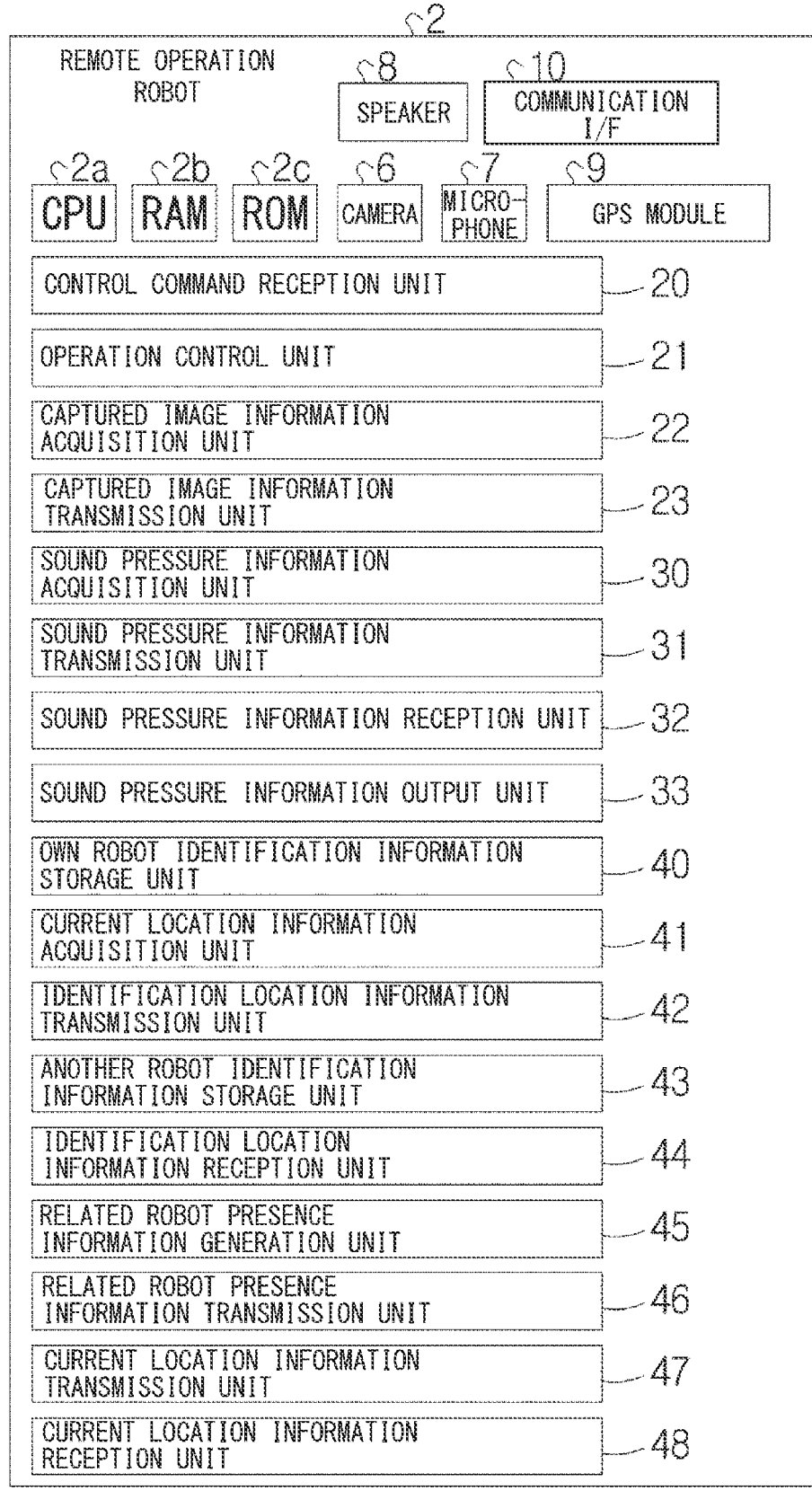
FIG. 2 is a functional block diagram of a remote operation robot.

FIG. 2 shows a functional block diagram of the remote operation robot 2. As shown in FIG. 2, the remote operation robot 2 includes a Central Processing Unit (CPU) 2a, a readable/writable Random Access Memory (RAM) 2b, and a Read Only Memory 2c. The remote operation robot 2 further includes, besides the camera 6, the microphone 7, and the speaker 8 mentioned above, a Global Positioning System (GPS) module 9 and a communication interface 10. The microphone 7 is one specific example of a mobile-body-side microphone. The speaker 8 is one specific example of a mobile-body-side speaker.

Then, the CPU2a loads a control program stored in the ROM 2c and executes the loaded control program, whereby the control program causes hardware such as the CPU2a to function as various functional units.

The various functional units include:
a control command reception unit 20;
an operation control unit 21;
a captured image information acquisition unit 22;
a captured image information transmission unit 23;
a sound pressure information acquisition unit 30;
a sound pressure information transmission unit 31;
a sound pressure information reception unit 32;
a sound pressure information output unit 33;
an own robot (i.e., body or remote operation mobile body) identification information storage unit 40;
a current location information acquisition unit 41;
an identification location information transmission unit 42;
an another robot identification information storage unit 43;
an identification location information reception unit 44;
a related robot presence information generation unit 45;
a related robot presence information transmission unit 46;
a current location information transmission unit 47; and
a current location information reception unit 48.

The control command reception unit 20 receives a control command from the corresponding remote operation terminal 3.

The operation control unit 21 controls the operation of the own robot based on the control command. The operation of the own robot includes an operation of moving the own robot by driving the plurality of wheels 5. Accordingly, the control command includes a moving command for moving the own robot.

The captured image information acquisition unit 22 acquires captured image information from the camera 6.

The captured image information transmission unit 23 transmits the captured image information acquired by the captured image information acquisition unit 22 to the corresponding remote operation terminal 3.

The sound pressure information acquisition unit 30 is one specific example of a mobile-body-side sound pressure information acquisition unit. The sound pressure information acquisition unit 30 acquires sound pressure information (voice signal) from the microphone 7.

The sound pressure information transmission unit 31 is one specific example of a mobile-body-side sound pressure information transmission unit. The sound pressure information transmission unit 31 transmits the sound pressure information acquired by the sound pressure information acquisition unit 30 to the corresponding remote operation terminal 3.

The sound pressure information reception unit 32 is one specific example of a mobile-body-side sound pressure information reception unit. The sound pressure information reception unit 32 receives sound pressure information from the corresponding remote operation terminal 3.

The sound pressure information output unit 33 is one specific example of a mobile-body-side output unit. The sound pressure information output unit 33 outputs the sound pressure information received by the sound pressure information reception unit 32 from the speaker 8.

The own robot identification information storage unit 40 stores robot identification information (i.e., body identification information) of the own robot. The robot identification information of the own robot is information for differentiating the own robot from other robots.

The current location information acquisition unit 41 acquires current location information indicating the current location of the own robot using the GPS module 9. The GPS module 9 is one specific example of a Global Navigation Satellite System (GNSS) module. Other specific examples of the GNSS module include a Galileo module, a BeiDou module, a Quasi-Zenith Satellite System (QZSS) module.

The identification location information transmission unit 42 transmits identification location information including the robot identification information and the current location information to another remote operation robot 2. The identification location information transmission unit 42 may transmit the identification location information to another remote operation robot 2 via the WAN, transmit the identification location information to another remote operation robot 2 via a remote sightseeing server, or transmit the identification location information to another remote operation robot 2 via Near field communication (NFC) such as Bluetooth (registered trademark) or Wi-Fi (registered trademark). The identification location information transmission unit 42 according to this embodiment transmits, as one example, the identification location information to another remote operation robot 2 via near field communication.

The other robot identification information storage unit 43 stores robot identification information of the remote operation robot 2 of a user who has a relation with the user who corresponds to the own robot. FIG. 3 illustrates the content stored in the other robot identification information storage unit 43 of the remote operation robot 2A. As shown in FIG. 3, the user A has a relation with users B, D, R, and Z. For example, the user A and the users B, D, R, and Z "know each other" or they are "friends". In this case, in this embodiment, the other robot identification information storage unit 43 stores the name of the user who has a relation with the user who corresponds to the own robot in association with the robot identification information of the remote operation robot 2 that the user remotely operates. The other robot identification information storage unit 43 may store user identification information of the user who has a relation with the user who corresponds to the own robot in association with the robot identification information of the remote operation robot 2 that the user remotely operates.

The identification location information reception unit 44 receives the identification location information from another remote operation robot 2, and stores the received identification location information in the RAM 2b. FIG. 4 illustrates the identification location information received by the identification location information reception unit 44. As shown in FIG. 4, the identification location information reception unit 44 receives, as one example, the identification location information from the remote operation robot 2 (robot ID: 8231) that the user B remotely operates and a remote operation robot 2 (robot ID: 2341) that another user remotely operates.

Referring once again to FIG. 2, the related robot presence information generation unit 45 generates related robot presence information indicating that the remote operation robot 2 of the user who has a relation with the user who corresponds to the own robot is close to the own robot based on the robot identification information stored in the other robot identification information storage unit 43 (see FIG. 3), the identification location information received by the identification location information reception unit 44 (FIG. 4), and the current location information of the own robot acquired by the current location information acquisition unit 41. Specifically, the related robot presence information generation unit 45 compares the current location information of all the pieces of identification location information received by the identification location information reception unit 44 with the current location information of the own robot acquired by the current location information acquisition unit 41 and calculates the distance between each of the other robots and the own robot. When the calculated distance is within a predetermined distance, the related robot presence information generation unit 45 typically determines that the corresponding remote operation robot 2 is located near the own robot. It is assumed, in this embodiment, that the remote operation robot 2 (robot ID: 8231) and the remote operation robot 2 (robot ID: 2341) are both located near the own robot. The related robot presence information generation unit 45 determines that the remote operation robot 2 of the user (user B) who has a relation with the user who corresponds to the own robot is near the own robot by referring to the robot identification information stored in the other robot identification information storage unit 43 shown in FIG. 3. Accordingly, the related robot presence information generation unit 45 generates related robot presence information indicating that the remote operation robot 2 of the user (user B) who has a relation with the user who corresponds to the own robot is near the own robot. The related robot presence information typically includes the user name of the corresponding user, robot identification information of the remote operation robot 2 of the corresponding user, and the current location information of the remote operation robot 2 of the corresponding user.

The related robot presence information transmission unit 46 transmits the related robot presence information generated by the related robot presence information generation unit 45 to the corresponding remote operation terminal 3.

The current location information transmission unit 47 transmits the current location information acquired from the current location information acquisition unit 41 to the corresponding remote operation terminal 3. The current location information transmission unit 47 transmits the current location information acquired by the current location information acquisition unit 41 to another remote operation robot 2.

The current location information reception unit 48 receives the current location information from the corresponding remote operation terminal 3. The current location information reception unit 48 receives the current location information from another remote operation robot 2.

(Remote Operation Terminal 3)

Figure 5:
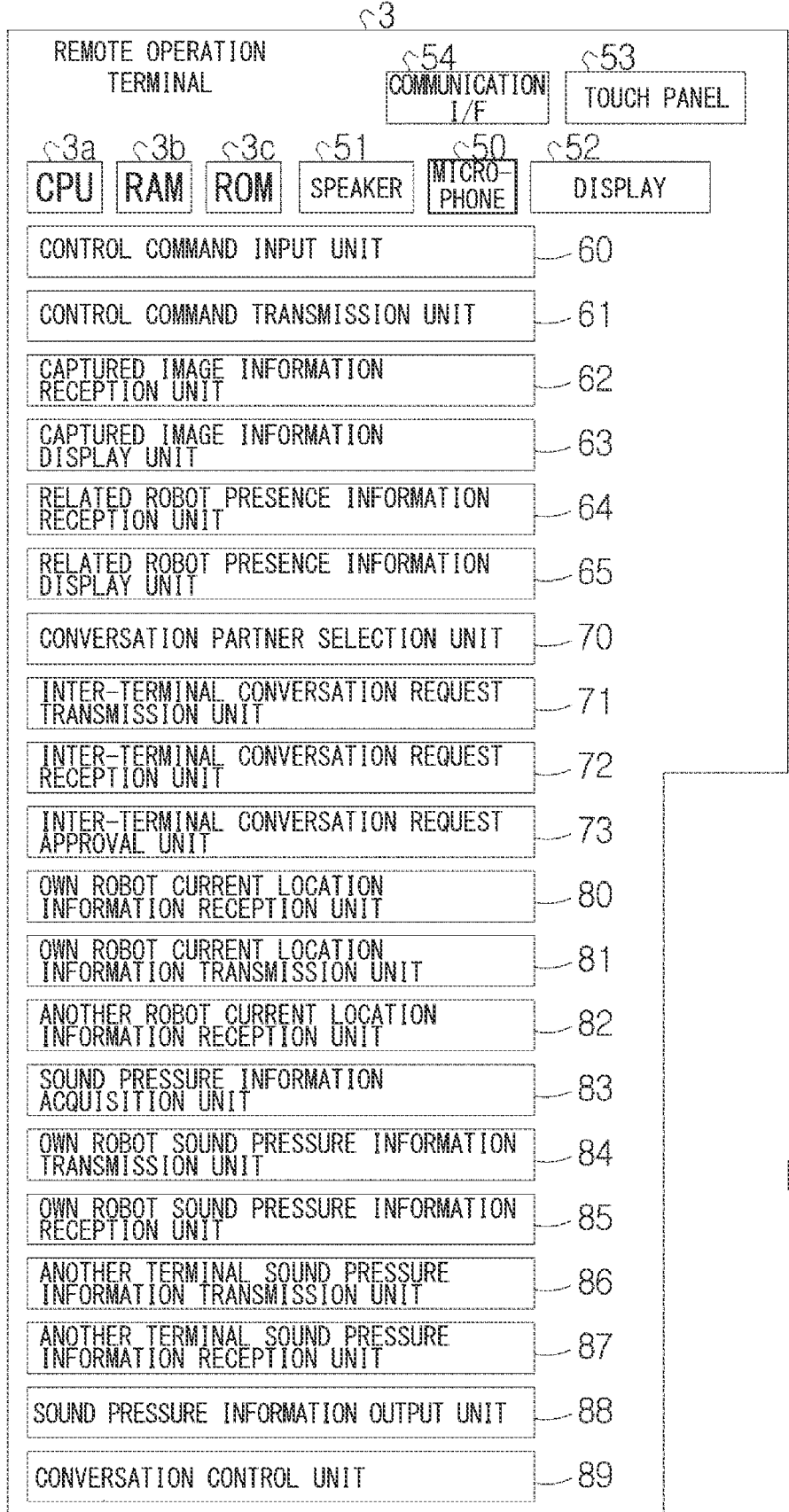
FIG. 5 is a functional block diagram of a remote operation terminal.

Referring next to FIG. 5, the remote operation terminal 3 will be described. As shown in FIG. 5, the remote operation terminal 3 includes a Central Processing Unit (CPU) 3a, a readable/writable Random Access Memory (RAM) 3b, and a Read Only Memory (ROM) 3c. The remote operation terminal 3 further includes a microphone 50, a speaker 51, a display 52, a touch panel 53, and a communication interface 54. The microphone 50 is one specific example of a terminal-side microphone. The speaker 51 is one specific example of a terminal-side speaker. The display 52 and the touch panel 53 are provided in such a way that they are superimposed on each other. Then, the CPU 3a loads a control program stored in the ROM 3c and executes the loaded control program, whereby the control program causes hardware such as the CPU 3a to function as various functional units.

The various functional units include:
a control command input unit 60;
a control command transmission unit 61;
a captured image information reception unit 62;
a captured image information display unit 63;
a related robot presence information reception unit 64;
a related robot presence information display unit 65;
a conversation partner selection unit 70;

an inter-terminal conversation request transmission unit 71;

an inter-terminal conversation request reception unit 72;

an inter-terminal conversation request approval unit 73;

an own robot current location information reception unit 80;

an own robot current location information transmission unit 81;

an another robot current location information reception unit 82;

a sound pressure information acquisition unit 83;

an own robot sound pressure information transmission unit 84;

an own robot sound pressure information reception unit 85;

an another terminal sound pressure information transmission unit 86;

an another terminal sound pressure information reception unit 87;

a sound pressure information output unit 88; and a conversation control unit 89.

Figure 6:
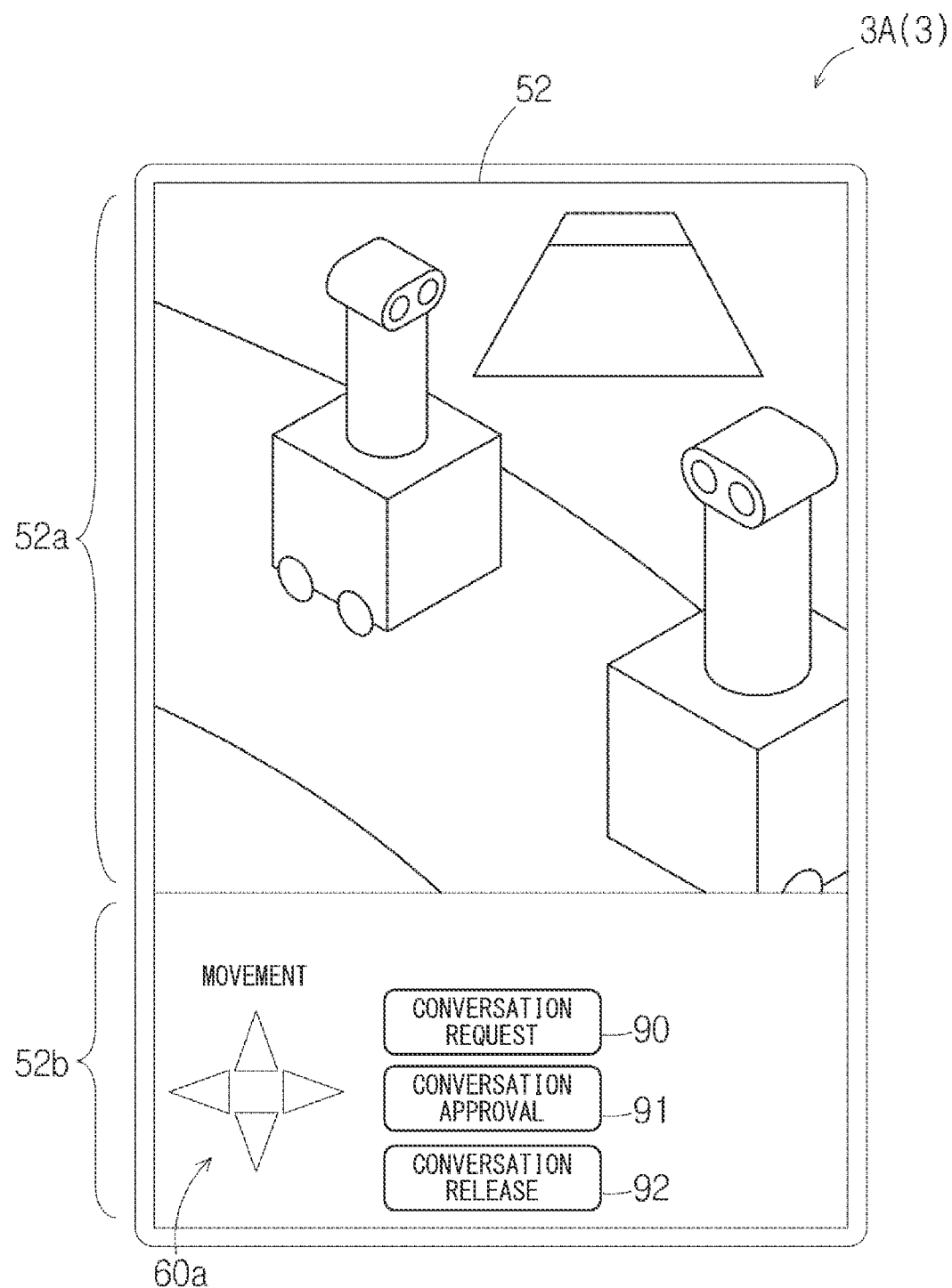
FIG. 6 is a diagram showing an example of the content displayed on a display of the remote operation terminal.

The control command input unit 60 accepts an operation of inputting a control command by the user. FIG. 6 shows a display example of the display 52 of the remote operation terminal 3. As shown in FIG. 6, the display screen of the display 52 includes an information display region 52*a* and an input region 52*b*. The control command input unit 60 displays various kinds of buttons for enabling the user to input control commands in the input region 52*b*. The various types of buttons include a four-direction button for moving 60*a* for enabling the user to input a moving command. The control command input unit 60 accepts the operation of inputting the control command by the user by detecting that the four-direction button for moving 60*a* has been tapped.

The remote operation terminal 3 further displays a conversation request button 90, a conversation approval button 91, and a conversation release button 92 in the input region 52*b*.

Referring once again to FIG. 5, the control command transmission unit 61 transmits the control command input by the user to the corresponding remote operation robot 2.

The captured image information reception unit 62 receives the captured image information from the corresponding remote operation robot 2.

As shown in FIG. 6, the captured image information display unit 63 displays the captured image information received by the captured image information reception unit 62 in the information display region 52*a* of the display 52.

Referring is made once again to FIG. 5, the related robot presence information reception unit 64 receives related robot presence information from the corresponding remote operation robot 2.

The related robot presence information display unit 65 displays the related robot presence information received by the related robot presence information reception unit 64 on the display 52.

The conversation partner selection unit 70 accepts an operation in which the user selects at least one remote operation robot 2 from at least one remote operation robot 2 shown in the captured image information that the captured image information display unit 63 displays in the information display region 52*a* of the display 52. Specifically, the conversation partner selection unit 70 detects which remote operation robot 2 the user has selected based on the coordinates of the positon on the touch panel 53 the user has tapped.

The inter-terminal conversation request transmission unit 71 transmits an inter-terminal conversation request to another remote operation terminal 3. Specifically, the inter-terminal conversation request transmission unit 71 transmits the inter-terminal conversation request to the remote operation terminal 3 that corresponds to the remote operation robot 2 selected by the user.

The inter-terminal conversation request reception unit 72 receives the inter-terminal conversation request from another remote operation terminal 3.

The inter-terminal conversation request approval unit 73 accepts an operation of approving an inter-terminal conversation request received from another remote operation terminal 3 by the user. Specifically, as shown in FIG. 6, the inter-terminal conversation request approval unit 73 determines whether the conversation approval button 91 has been tapped. When the inter-terminal conversation request approval unit 73 determines that the conversation approval button 91 has been tapped, it determines that the user has approved the inter-terminal conversation request received from the other remote operation terminal 3.

The own robot current location information reception unit 80 receives the current location information from the corresponding remote operation robot 2.

The own robot current location information transmission unit 81 transmits the current location information received by the own robot current location information reception unit 80 to another remote operation terminal 3.

The other robot current location information reception unit 82 receives the current location information from another remote operation terminal 3.

The sound pressure information acquisition unit 83 is one specific example of a terminal-side sound pressure information acquisition unit. The sound pressure information acquisition unit 83 acquires sound pressure information from the microphone 50.

The own robot sound pressure information transmission unit 84 is one specific example of a first-terminal-side sound pressure information transmission unit. The own robot sound pressure information transmission unit 84 transmits the sound pressure information acquired by the sound pressure information acquisition unit 83 to the corresponding remote operation robot 2.

The own robot sound pressure information reception unit 85 is one specific example of a first-terminal-side sound pressure information reception unit. The own robot sound pressure information reception unit 85 receives sound pressure information from the corresponding remote operation robot 2.

The other terminal sound pressure information transmission unit 86 is one specific example of a second-terminal-side sound pressure information transmission unit. The other terminal sound pressure information transmission unit 86 transmits the sound pressure information acquired by the sound pressure information acquisition unit 83 to another remote operation terminal 3. Specifically, the other terminal sound pressure information transmission unit 86 transmits the sound pressure information acquired by the sound pressure information acquisition unit 83 to the IP address of another remote operation terminal 3 via the WAN.

The other terminal sound pressure information reception unit 87 is one specific example of a second-terminal-side sound pressure information reception unit. The other terminal sound pressure information reception unit 87 receives the sound pressure information from another remote operation terminal 3. Specifically, the other terminal sound pressure information reception unit 87 receives sound pressure information transmitted to its own IP address from another remote operation terminal 3 via WAN.

The sound pressure information output unit 88 outputs, from the speaker 8, the sound pressure information that the own robot sound pressure information reception unit 85 or the other terminal sound pressure information reception unit 87 has received.

The conversation control unit 89 executes an inter-robot conversation mode that establishes the conversation with another user using the own robot sound pressure information transmission unit 84 and the own robot sound pressure information reception unit 85 and an inter-terminal conversation mode that establishes the conversation with another user using the other terminal sound pressure information transmission unit 86 and the other terminal sound pressure information reception unit 87 in such a way that these two modes can be switched. The robot conversation mode is one specific example of an inter-mobile-body conversation mode.

That is, in the inter-robot conversation mode, when each user talks in the microphone 50 of the remote operation terminal 3 that this user has, the sound pressure information generated by the microphone 50 is transmitted to the corresponding remote operation robot 2, and is output from the speaker 8 of the remote operation robot 2 as a longitudinal wave that propagates through the air. The longitudinal wave that propagates through the air is picked up by the microphone 7 of the other robot, converted into sound pressure information, transmitted to the remote operation terminal 3 that corresponds to the other robot, and the sound pressure information is output from the speaker 51 of the remote operation terminal 3. To put it simply, the users A and B talk to each other via the remote operation terminal 3A, the remote operation robot 2A, the remote operation robot 2B, and the remote operation terminal 3B. Accordingly, in the inter-robot conversation mode, the environmental sounds are mixed with a user's voice, whereby a realistic user experience is provided.

On the other hand, in the inter-terminal conversation mode, when each user talks in the microphone 50 of the remote operation terminal 3 that this user has, the sound pressure information generated by the microphone 50 is directly transmitted to the remote operation terminal 3 of the conversation partner via the WAN, and the sound pressure information is output from the speaker 51 of the remote operation terminal 3. To put it simply, the users A and B talk to each other via the remote operation terminal 3A and the remote operation terminal 3B. Therefore, in the inter-terminal conversation mode, environmental sounds are not mixed with the user's voice, whereby a clear conversation is achieved.

Figure 7:
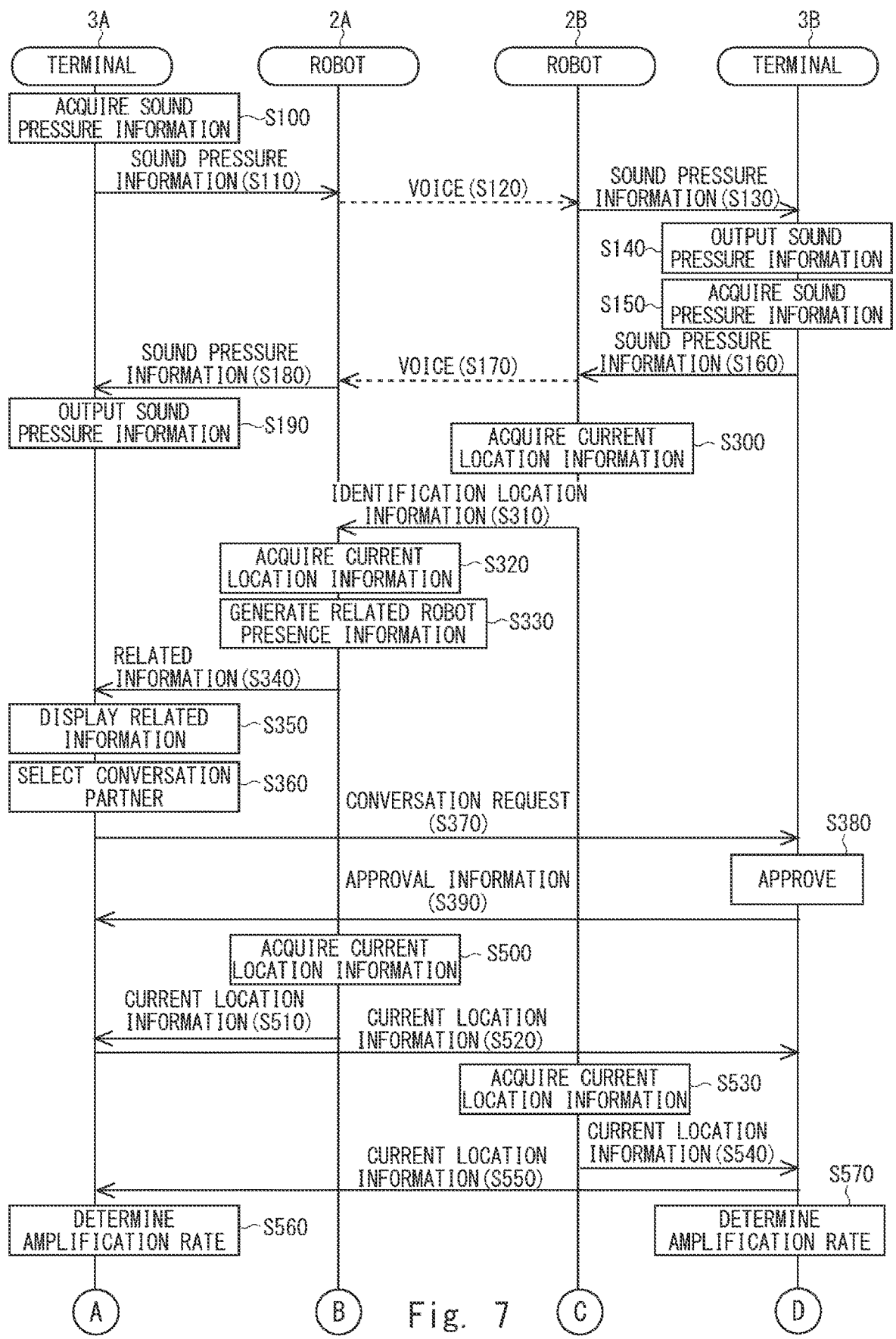
FIG. 7 is a sequence diagram of a remote sightseeing system.
Figure 8:
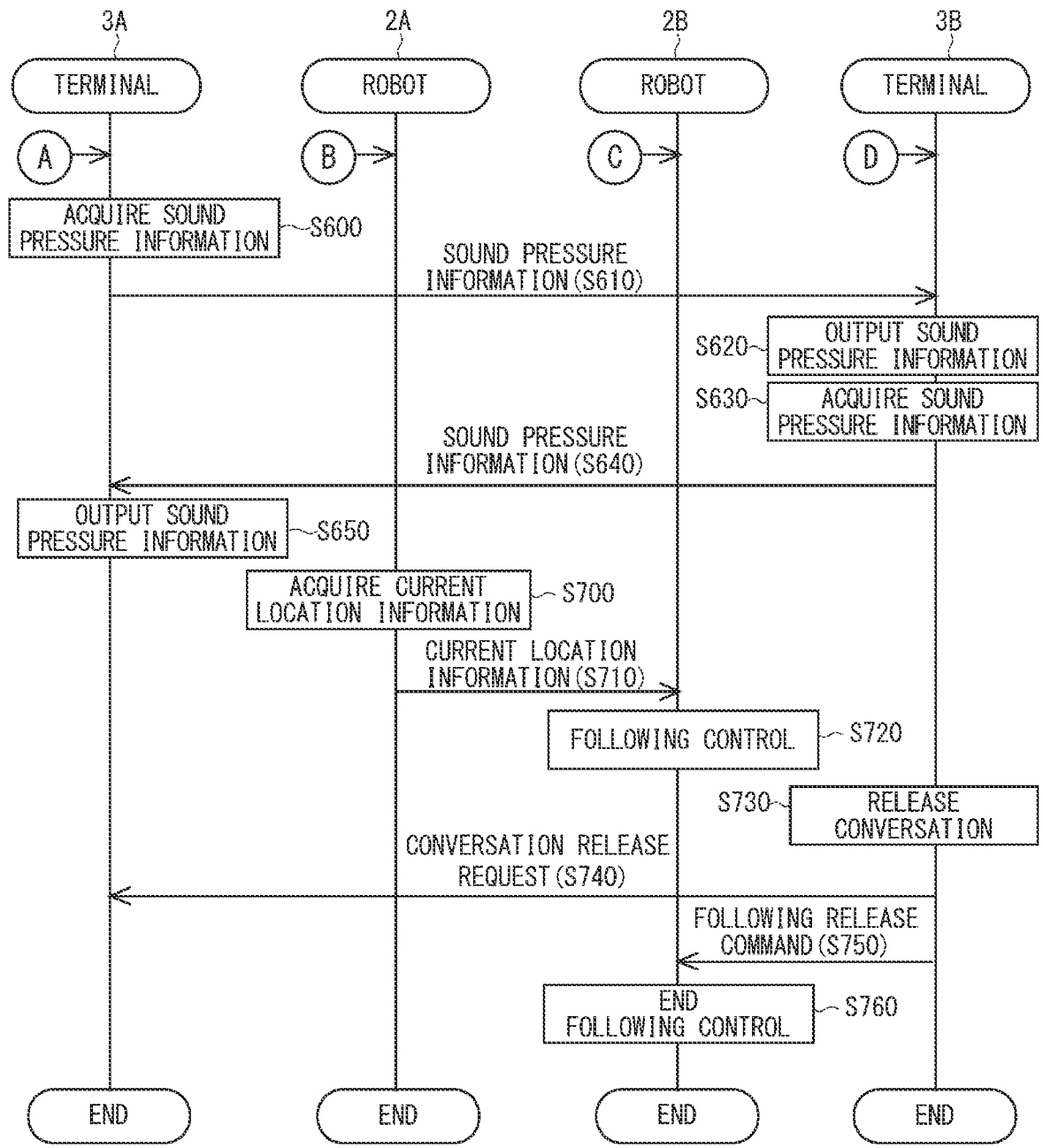
FIG. 8 is a sequence diagram of the remote sightseeing system.

Referring next to FIGS. 7 and 8, an operation flow of the remote sightseeing system 1 will be described. FIGS. 7 and 8 each show a sequence diagram of the remote sightseeing system 1. In the following, for the sake of convenience of the description, it is assumed that the remote operation robot 2A and the remote operation robot 2B are located close to each other in the same tourist spot. It is further assumed that the users A and B know each other. It is further assumed that the user A wants to talk to the user B in the inter-terminal conversation mode. It is further assumed that the conversation control unit 89 of the remote operation terminal 3 executes the inter-robot conversation mode shown in Steps S100 to S190.

(Inter-Robot Conversation Mode)
S100:
First, when the user A talks in the microphone 50 of the remote operation terminal 3A, the sound pressure information acquisition unit 83 of the remote operation terminal 3A acquires the sound pressure information from the microphone 50 of the remote operation terminal 3A.
S110:
Next, the own robot sound pressure information transmission unit 84 of the remote operation terminal 3A transmits the sound pressure information acquired by the sound pressure information acquisition unit 83 to the remote operation robot 2A. Further, the sound pressure information reception unit 32 of the remote operation robot 2A receives the sound pressure information from the remote operation terminal 3A.
S120:
Next, the sound pressure information output unit 33 of the remote operation robot 2A outputs the sound pressure information received by the sound pressure information reception unit 32 from the speaker 8. Then, the voice is output through the air from the speaker 8 as a longitudinal wave. The voice that propagates through the air as an acoustic wave that vibrates the air is picked up by the microphone 7 of the remote operation robot 2B along with the environmental sounds, and is then converted into a voice signal. The sound pressure information acquisition unit 30 of the remote operation robot 2B acquires the sound pressure information from the microphone 7 of the remote operation robot 2B.
S130:
Next, the sound pressure information transmission unit 31 of the remote operation robot 2B transmits the sound pressure information acquired by the sound pressure information acquisition unit 30 to the remote operation terminal 3B. The own robot sound pressure information reception unit 85 of the remote operation terminal 3B receives the sound pressure information from the remote operation robot 2B.
S140:
Next, the sound pressure information output unit 88 of the remote operation robot 2B outputs the sound pressure information received by the own robot sound pressure information reception unit 85 from the speaker 51.

As described above, as a result of the processing from Step S100 to Step S140, the voice of the user A reaches the user B.
S150:
Next, when the user B talks in the microphone 50 of the remote operation terminal 3B, the sound pressure information acquisition unit 83 of the remote operation terminal 3B acquires the sound pressure information from the microphone 50 of the remote operation terminal 3B.
S160:
Next, the own robot sound pressure information transmission unit 84 of the remote operation terminal 3B transmits the sound pressure information acquired by the sound pressure information acquisition unit 83 to the remote operation robot 2B. Further, the sound pressure information reception unit 32 of the remote operation robot 2B receives the sound pressure information from the remote operation terminal 3B.
S170:
Next, the sound pressure information output unit 33 of the remote operation robot 2B outputs the sound pressure information received by the sound pressure information reception unit 32 from the speaker 8. Then, the voice, which becomes a longitudinal wave that vibrates the air, is output through the air from the speaker 8. The voice that propagates through the air is picked up by the microphone 7 of the remote operation robot 2A along with the environmental sounds, and is then converted into a voice signal. The sound pressure information acquisition unit 30 of the remote operation robot 2A acquires the sound pressure information from the microphone 7 of the remote operation robot 2A.
S180:

Next, the sound pressure information transmission unit 31 of the remote operation robot 2A transmits the sound pressure information acquired by the sound pressure information acquisition unit 30 to the remote operation terminal 3A. The own robot sound pressure information reception unit 85 of the remote operation terminal 3A receives the sound pressure information from the remote operation robot 2A.
S190:

Next, the sound pressure information output unit 88 of the remote operation robot 2A outputs the sound pressure information received by the own robot sound pressure information reception unit 85 from the speaker 51.

As described above, as a result of the processing from Step S150 to Step S190, the voice of the user B reaches the user A.

The conversation control unit 89 of each of the remote operation terminals 3 repeatedly executes Step S100 to Step S190 stated above while the inter-robot conversation mode is being executed.
(Conversation Request)
S300:

Next, the current location information acquisition unit 41 of the remote operation robot 2B acquires the current location information of the own robot.
S310:

Next, the identification location information transmission unit 42 of the remote operation robot 2B generates identification location information including the robot identification information and the current location information of the own robot, and transmits the generated identification location information to the remote operation robot 2A. The identification location information reception unit 44 of the remote operation robot 2A receives the identification location information from the remote operation robot 2B and stores the received identification location information in the RAM 2b.

The identification location information reception unit 44 of the remote operation robot 2A receives identification location information also from a remote operation robot 2 other than the remote operation robot 2B, and stores the received identification location information in the RAM 2b.

Figure 9:
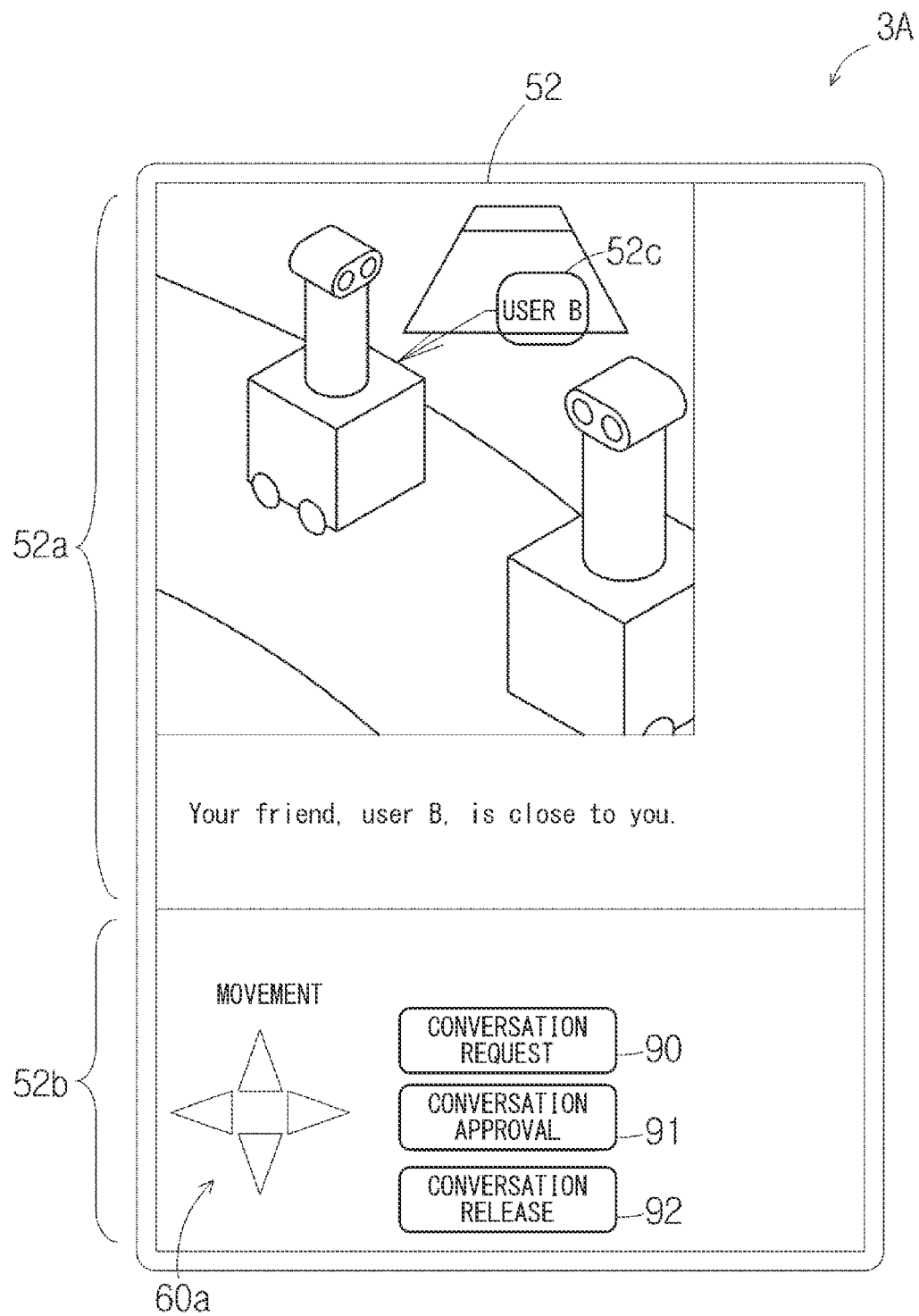
FIG. 9 is a diagram showing an example of the content displayed on the display of the remote operation terminal.

As a result, as shown in FIG. 4, the RAM 2b of the remote operation robot 2A stores two pieces of identification location information received from the two respective remote operation robots 2.
S320:

Next, the current location information acquisition unit 41 of the remote operation robot 2A acquires the current location information of the own robot.
S330:

Next, the related robot presence information generation unit 45 of the remote operation robot 2A generates related robot presence information indicating that the remote operation robot 2 of the user who has a relation with the user who corresponds to the own robot is close to the own robot based on the robot identification information stored in the other robot identification information storage unit 43 (see FIG. 3), the identification location information received by the identification location information reception unit 44 (FIG. 4), and the current location information of the own robot acquired by the current location information acquisition unit 41. Specifically, the related robot presence information generation unit 45 compares the robot identification information stored in the other robot identification information storage unit 43 (see FIG. 3) with the identification location information received by the identification location information reception unit 44 (FIG. 4) and extracts the identification location information whose robot identification information overlap each other from the identification location information received by the identification location information reception unit 44 (FIG. 4). That is, the related robot presence information generation unit 45 extracts one of the two pieces of identification location information shown in FIG. 4 that corresponds to the user B. Then, the related robot presence information generation unit 45 compares the current location information included in the identification location information that corresponds to the user B extracted by the related robot presence information generation unit 45 with the current location information of the own robot, and determines whether the remote operation robot 2B is present within a predetermined distance from the own robot. When it is determined that the remote operation robot 2B is present within a predetermined distance from the own robot, the related robot presence information generation unit 45 generates the related robot presence information including the identification location information that corresponds to the user B.
S340:

Next, the related robot presence information transmission unit 46 of the remote operation robot 2A transmits the related robot presence information to the remote operation terminal 3A. The related robot presence information reception unit 64 of the remote operation terminal 3A receives the related robot presence information from the remote operation robot 2A.
S350:

Next, the related robot presence information display unit 65 of the remote operation terminal 3A displays the related robot presence information received by the related robot presence information reception unit 64 on the display 52. FIG. 9 shows a state in which the related robot presence information display unit 65 displays the related robot presence information in the information display region 52a of the display 52. As shown in FIG. 9, the related robot presence information display unit 65 refers to the other robot identification information storage unit 43 to acquire the user name that corresponds to the robot identification information included in the related robot presence information, generates a text message such as "Your friend, user B, is close to you.", and displays this text message in the information display region 52a of the display 52. Further, when the remote operation robot 2B that corresponds to the user B is displayed on the display 52, an icon 52c with which the remote operation robot 2B can be specified in the display 52 may be superimposed on the captured image information displayed on the display 52.

Whether or not the remote operation robot 2 displayed on the display 52 corresponds to the remote operation robot 2B can be determined, for example, as follows. First, the remote operation robot 2 displayed on the display 52 is detected by a known object detection technique such as Faster R-CNN, YOLO, or SSD. Based on the position and the size of the bounding box generated by object detection, the current location information of the own robot, and imaging conditions including the imaging direction of the camera 6 of the own robot, the current location information of the remote operation robot 2 that has been detected is generated. When this current location information is compared with the current location information received from the remote operation robot 2B and the difference between them is equal to or smaller than a predetermined value, it can be determined that the remote operation robot 2 displayed on the display 52 corresponds to the remote operation robot 2B. Alternatively, a QR code (registered mark) may be, for example, provided in the robot body 4 of each of the remote operation robots 2, and may be determined whether or not the remote operation robot 2 displayed on the display 52 corresponds to the remote operation robot 2B by reading out the QR code.

Figure 10:
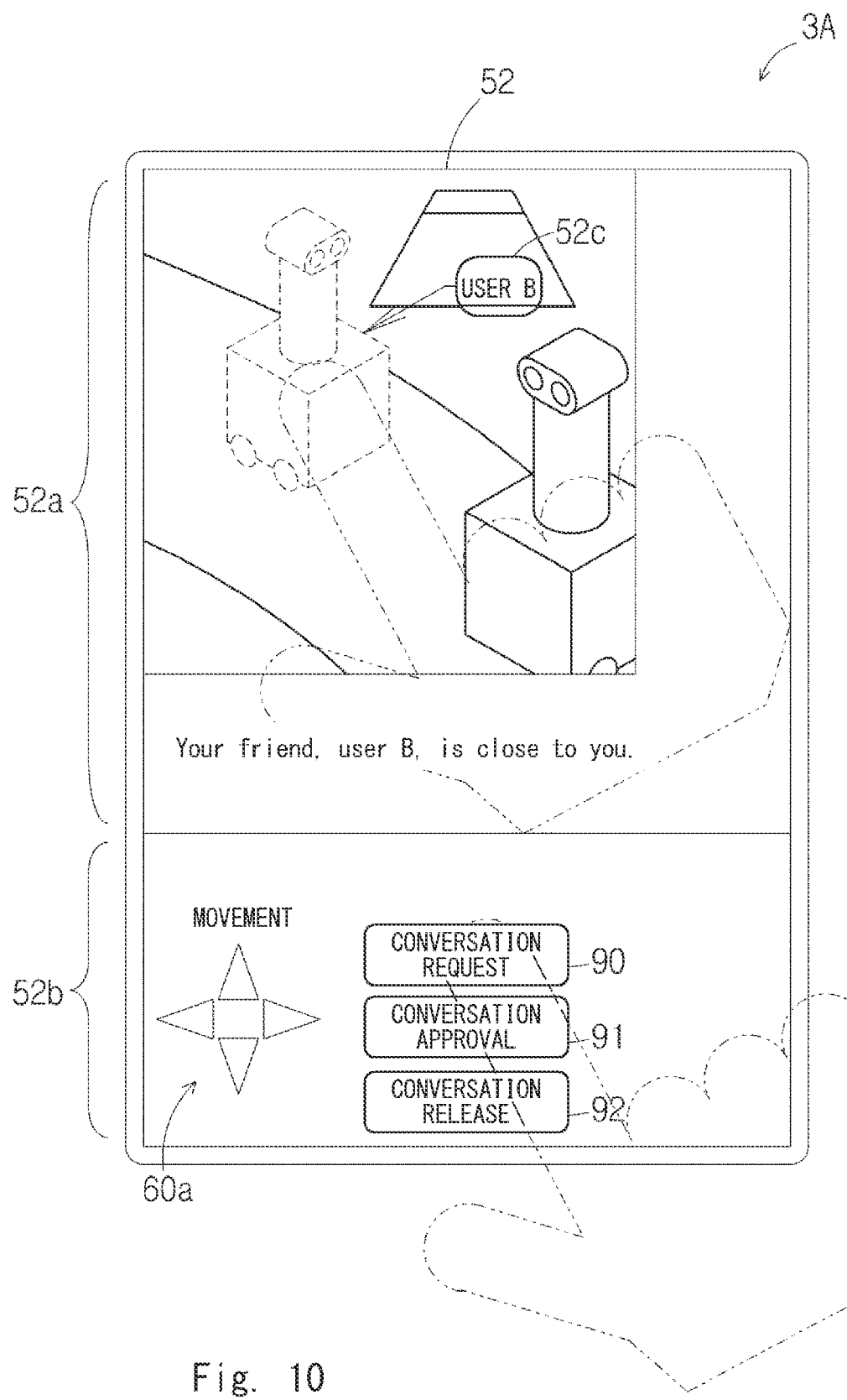
FIG. 10 is a diagram showing an example of the content displayed on the display of the remote operation terminal.

S360:

Next, as shown in FIG. 10, the user A taps the remote operation robot 2B displayed on the display 52. Then, the conversation partner selection unit 70 of the remote operation terminal 3A determines that the remote operation robot 2B has been selected from the plurality of remote operation robots 2 displayed on the display 52 based on the coordinates of the part where the user A has tapped.

S370:

The user A then taps the inter-terminal conversation request button 90. Then, the inter-terminal conversation request transmission unit 71 of the remote operation terminal 3A transmits the inter-terminal conversation request to the remote operation terminal 3B. The inter-terminal conversation request reception unit 72 of the remote operation terminal 3B receives the inter-terminal conversation request from the remote operation terminal 3A.

Figure 11:
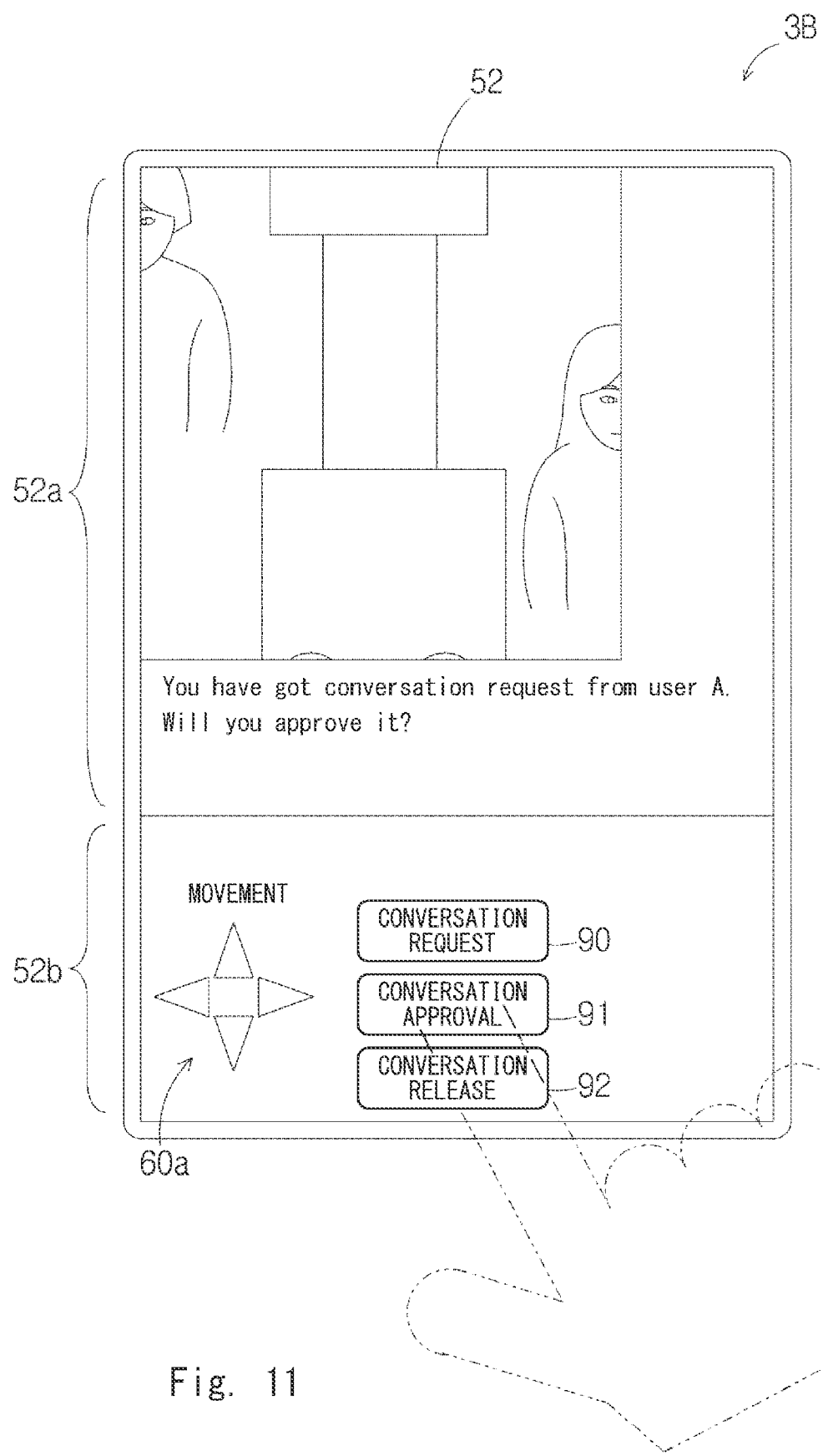
FIG. 11 is a diagram showing an example of the content displayed on the display of the remote operation terminal.
Figure 12:
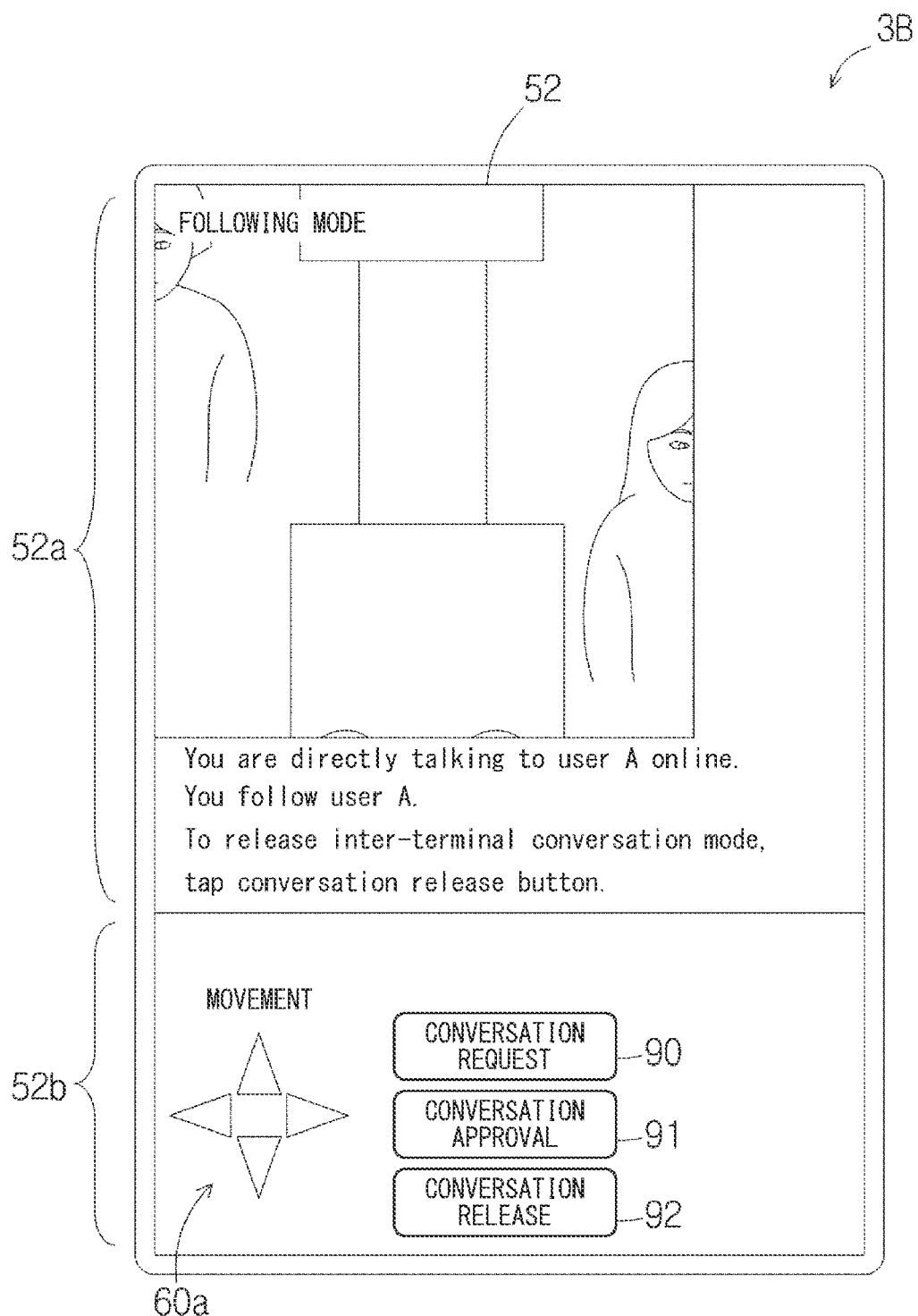
FIG. 12 is a diagram showing an example of the content displayed on the display of the remote operation terminal.

S380:

Next, as shown in FIG. 11, the inter-terminal conversation request approval unit 73 of the remote operation terminal 3B displays information indicating that the inter-terminal conversation request has been received from the remote operation terminal 3A in the information display region 52a of the display 52. Next, the user B taps the conversation approval button 91. Then, the inter-terminal conversation request approval unit 73 determines that the user B has approved the inter-terminal conversation request.

S390:

The inter-terminal conversation request approval unit 73 of the remote operation terminal 3B transmits approval information indicating that the inter-terminal conversation request from the user A to the user B has been approved to the remote operation terminal 3A. Upon completion of the transmission of the approval information, the conversation control units 89 of the remote operation terminal 3A and the remote operation terminal 3B switch the mode of the conversation from the inter-robot conversation mode to the inter-terminal conversation mode.

(Inter-Terminal Conversation Mode)

First, the remote operation terminal 3A and the remote operation terminal 3B share the current location information of their remote operation robots 2 by executing the processing from Step S500 to Step S550.

S500:

First, the current location information acquisition unit 41 of the remote operation robot 2A acquires the current location information of the own robot.

S510:

Next, the current location information transmission unit 47 of the remote operation robot 2A transmits the current location information of the own robot to the remote operation terminal 3A. The own robot current location information reception unit 80 of the remote operation terminal 3A receives the current location information of the remote operation robot 2A from the remote operation robot 2A.

S520:

Next, the own robot current location information transmission unit 81 of the remote operation terminal 3A transmits the current location information of the own robot to the remote operation terminal 3B. The other robot current location information reception unit 82 of the remote operation terminal 3B receives the current location information of the remote operation robot 2A from the remote operation terminal 3A.

S530:

Next, the current location information acquisition unit 41 of the remote operation robot 2B acquires the current location information of the own robot.

S540:

Next, the current location information transmission unit 47 of the remote operation robot 2B transmits the current location information of the own robot to the remote operation terminal 3B. The own robot current location information reception unit 80 of the remote operation terminal 3B receives the current location information of the remote operation robot 2B from the remote operation robot 2B.

S550:

Next, the own robot current location information transmission unit 81 of the remote operation terminal 3B transmits the current location information of the own robot to the remote operation terminal 3A. The other robot current location information reception unit 82 of the remote operation terminal 3A receives the current location information of the remote operation robot 2B from the remote operation terminal 3B.

S560 and S570:

Next, the sound pressure information output unit 88 of the remote operation terminal 3A calculates, based on the current location information of the own robot received by the own robot current location information reception unit 80 and the current location information of the remote operation robot 2B received by the other robot current location information reception unit 82, the distance between the remote operation robot 2A and the remote operation robot 2B that correspond to the respective users who make a conversation, and determines, based on the calculated distance, an amplification rate of the sound pressure information when the sound pressure information is output. Specifically, the sound pressure information output unit 88 determines the amplification rate in such a way that the amplification rate becomes smaller as the calculated distance is longer and the amplification rate becomes larger as the calculated distance is shorter. The sound pressure information output unit 88 of the remote operation terminal 3B also determines the amplification rate in the same manner. Accordingly, when the remote operation robot 2A and the remote operation robot 2B are located apart from each other, the voice of the conversation partner sounds is muffled. On the other hand, when the remote operation robot 2A and the remote operation robot 2B are close to each other, the voice of the conversation partner sounds louder. Accordingly, it is possible to provide a realistic user experience.

S600:

Next, when the user A talks in the microphone 50 of the remote operation terminal 3A, the sound pressure information acquisition unit 83 of the remote operation terminal 3A acquires the sound pressure information from the microphone 50 of the remote operation terminal 3A.

S610:

Next, the other terminal sound pressure information transmission unit 86 of the remote operation terminal 3A transmits the sound pressure information acquired by the sound pressure information acquisition unit 83 to the remote operation terminal 3B. Further, the other terminal sound pressure information reception unit 87 of the remote operation terminal 3B receives the sound pressure information from the remote operation terminal 3A.

S620:

Next, the sound pressure information output unit 88 of the remote operation terminal 3B amplifies the sound pressure information received by the other terminal sound pressure information reception unit 87 based on the amplification rate determined in Step S570, and outputs the sound pressure information after being amplified from the speaker 51.

As described above, as a result of the processing from Step S600 to Step S620, the user B can hear the voice of the user A clearly.

S630:

Next, when the user B talks in the microphone 50 of the remote operation terminal 3B, the sound pressure information acquisition unit 83 of the remote operation terminal 3B acquires the sound pressure information from the microphone 50 of the remote operation terminal 3B.

S640:

Next, the other terminal sound pressure information transmission unit 86 of the remote operation terminal 3B transmits the sound pressure information acquired by the sound pressure information acquisition unit 83 to the remote operation terminal 3A. Further, the other terminal sound pressure information reception unit 87 of the remote operation terminal 3A receives the sound pressure information from the remote operation terminal 3B.

S650:

Next, the sound pressure information output unit 88 of the remote operation terminal 3A amplifies the sound pressure information received by the other terminal sound pressure information reception unit 87 based on the amplification rate determined in Step S560, and outputs the sound pressure information after being amplified from the speaker 51.

As described above, as a result of the processing from Step S630 to Step S650, the user A can hear the voice of the user B clearly.

The conversation control unit 89 of each of the remote operation terminals 3 repeatedly executes Steps S500 to S650 stated above while the inter-terminal conversation mode is being executed.

(Robot Following)

While the conversation control units 89 of the remote operation terminal 3A and the remote operation terminal 3B are executing the inter-terminal conversation mode, the operation control unit 21 of the remote operation robot 2B controls the operation of the remote operation robot 2B in such a way that the remote operation robot 2B moves following the remote operation robot 2A. This provides user experience for the users A and B so that they can feel they are strolling around the tourist spot together. Specifically, the details thereof are as follows.

S700:

First, the current location information acquisition unit 41 of the remote operation robot 2A acquires the current location information of the own robot.

S710:

Next, the current location information transmission unit 47 of the remote operation robot 2A transmits the current location information to the remote operation robot 2B. The current location information reception unit 48 of the remote operation robot 2B receives the current location information of the remote operation robot 2A from the remote operation robot 2A.

S720:

Then, the operation control unit 21 of the remote operation robot 2B controls the operation of the own robot in such a way that it moves following the remote operation robot 2A.

In this embodiment, the remote operation robot 2B that corresponds to the remote operation terminal 3B that has received the inter-terminal conversation request follows the remote operation robot 2A that corresponds to the remote operation terminal 3A that has transmitted the inter-terminal conversation request. Alternatively, the remote operation robot 2A that corresponds to the remote operation terminal 3A that has transmitted the inter-terminal conversation request may follow the remote operation robot 2B that corresponds to the remote operation terminal 3B that has received the inter-terminal conversation request.

S730:

Next, the user B taps the conversation release button 92, and then the conversation control unit 89 of the remote operation terminal 3B switches the mode of the conversation from the inter-terminal conversation mode to the inter-robot conversation mode.

S740:

Further, the conversation control unit 89 of the remote operation terminal 3B transmits a conversation release request to the remote operation terminal 3A. The conversation control unit 89 of the remote operation terminal 3A receives the conversation release request from the remote operation terminal 3B. Accordingly, the conversation control unit 89 of the remote operation terminal 3A switches the mode of the conversation from the inter-terminal conversation mode to the inter-robot conversation mode.

S750:

The remote operation terminal 3B transmits the following release command to the remote operation robot 2B.

S760:

Upon receiving the following release command from the remote operation terminal 3B, the operation control unit 21 of the remote operation robot 2B ends the following control.

The first embodiment has been described above. The above embodiment has the following features.

The remote sightseeing system 1 (remote operation system) is a system in which a plurality of users who are present in locations away from each other remotely operate a plurality of remote operation robots 2 (remote operation mobile bodies) that are present in one place by operating the respective remote operation terminals 3 that they have. The remote sightseeing system 1 includes the plurality of remote operation robots 2 and the plurality of remote operation terminals 3. Each of the remote operation robots 2 includes the control command reception unit 20 configured to receive the control command from the corresponding remote operation terminal 3, the operation control unit 21 configured to control the operation of the own robot based on the control command, the camera 6 (imaging unit), the captured image information acquisition unit 22 configured to acquire the captured image information from the camera 6, the captured image information transmission unit 23 configured to transmit the captured image information to the corresponding remote operation terminal 3, the microphone 7 (mobile-body-side microphone), the sound pressure information acquisition unit 30 (mobile-body-side sound pressure information acquisition unit) configured to acquire the sound pressure information from the microphone 7, the sound pressure information transmission unit 31 (mobile-body-side sound pressure information transmission unit) configured to transmit the sound pressure information acquired by the sound pressure information acquisition unit 30 to the corresponding remote operation terminal 3, the sound pressure information reception unit 32 (mobile-body-side sound pressure information reception unit) configured to receive the sound pressure information from the corresponding remote operation terminal 3, and the sound pressure information output unit 33 (mobile-body-side output unit) configured to output the sound pressure information received by the sound pressure information reception unit 32. Each of the remote operation terminals 3 includes the control command input unit 60 configured to accept the operation of inputting the control command, the control command transmission unit 61 configured to transmit the control command to the corresponding remote operation robot 2, the captured image information reception unit 62 configured to receive the captured image information from the corresponding remote operation robot 2, the captured image information display unit 63 configured to display the captured image information, the microphone 50 (terminal-side microphone), the sound pressure information acquisition unit 83 (terminal-side sound pressure information acquisition unit) configured to acquire the sound pressure information from the microphone 50, the own robot sound pressure information transmission unit 84 (first-terminal-side sound pressure information transmission unit) configured to transmit the sound pressure information acquired by the sound pressure information acquisition unit 83 to the corresponding remote operation robot 2, the own robot sound pressure information reception unit 85 (first-terminal-side sound pressure information reception unit) configured to receive the sound pressure information from the corresponding remote operation robot 2, the other terminal sound pressure information transmission unit 86 (second-terminal-side sound pressure information transmission unit) configured to transmit the sound pressure information acquired by the sound pressure information acquisition unit 83 to another remote operation terminal 3, the other terminal sound pressure information reception unit 87 (second-terminal-side sound pressure information reception unit) configured to receive the sound pressure information from another remote operation terminal 3, the sound pressure information output unit 88 (terminal-side output unit) configured to output the sound pressure information received by the own robot sound pressure information reception unit 85 or the other terminal sound pressure information reception unit 87, and the conversation control unit 89 configured to execute the inter-robot conversation mode (inter-mobile-body conversation mode) that establishes the conversation with another user using the own robot sound pressure information transmission unit 84 and the own robot sound pressure information reception unit 85 and the inter-terminal conversation mode that establishes the conversation with another user using the other terminal sound pressure information transmission unit 86 and the other terminal sound pressure information reception unit 87 in such a way that these two modes can be switched. According to the aforementioned configuration, when a plurality of users who are present in locations away from each other remotely operate a plurality of respective remote operation robots 2 that are present in one place by operating the respective remote operation terminals 3 that these users have, a clear conversation between the plurality of users is achieved. Furthermore, it is possible to provide a realistic user experience in which environmental sounds are mixed with the user's voice and a clear conversation without environmental sounds mixed with the user's voice in such a way that they can be switched.

Each of the remote operation robots 2 further includes the own robot identification information storage unit 40 configured to store robot identification information of the own robot; the current location information acquisition unit 41 configured to acquire the current location information of the own robot; the identification location information transmission unit 42 configured to transmit identification location information including the robot identification information and the current location information to another remote operation robot 2, the other robot identification information storage unit 43 configured to store the robot identification information of the remote operation robot 2 of the user who has a relation with the user who corresponds to the own robot, the identification location information reception unit 44 configured to receive identification location information from another remote operation robot 2, the related robot presence information generation unit 45 (related mobile body presence information generation unit) configured to generate related mobile body presence information indicating that the remote operation robot 2 of the user who has a relation with the user who corresponds to the own robot is near the own robot based on the robot identification information stored in the other robot identification information storage unit 43, the identification location information received by the identification location information reception unit 44, and the current location information acquired by the current location information acquisition unit 41, and the related robot presence information transmission unit 46 (related mobile body presence information transmission unit) configured to transmit the related mobile body presence information to the corresponding remote operation terminal 3. Each of the remote operation terminals 3 includes the related robot presence information reception unit 64 (related mobile body presence information reception unit) configured to receive the related mobile body presence information from the corresponding remote operation robot 2 and the related robot presence information display unit 65 (related mobile body presence information display unit) configured to display the related mobile body presence information. According to the aforementioned configuration, it is possible to easily know that the remote operation robot 2 of the user who has a relation is near the own remote operation robot 2.

Each of the remote operation terminals 3 further includes the inter-terminal conversation request transmission unit 71 configured to transmit the inter-terminal conversation request to another remote operation terminal 3, the inter-terminal conversation request reception unit 72 configured to receive the inter-terminal conversation request from another remote operation terminal 3, and the inter-terminal conversation request approval unit 73 configured to accept the operation of approving the inter-terminal conversation request received from the other remote operation terminal 3. The conversation control unit 89 of each of the remote operation terminals 3 executes the inter-terminal conversation mode in place of the inter-robot conversation mode after the inter-terminal conversation request is approved. According to the aforementioned configuration, the inter-terminal conversation mode can be executed with a high security.

Each of the remote operation terminals 3 further includes the conversation partner selection unit 70 configured to accept the operation of selecting at least one remote operation robot 2 from at least one remote operation robot 2 shown in the captured image information displayed by the captured image information display unit 63. The inter-terminal conversation request transmission unit 71 transmits the inter-terminal conversation request to the remote operation terminal 3 that corresponds to the at least one remote operation robot 2 that has been selected. According to the aforementioned configuration, it is possible to intuitively select the other robot to which the inter-terminal conversation request is transmitted.

The operation control unit 21 controls the operation of the own robot in such a way that the own robot moves following the remote operation robot 2 that corresponds to the remote operation terminal 3 that has transmitted the inter-terminal conversation request while the conversation control unit 89 of the corresponding remote operation terminal 3 is executing the inter-terminal conversation mode. According to the aforementioned configuration, while the inter-robot conversation mode is being executed, the own robot moves following the remote operation robot 2 with which it is talking.

Each of the remote operation robots 2 includes the current location information acquisition unit 41 configured to acquire the current location information of the own robot and the current location information transmission unit 47 configured to transmit the current location information to the corresponding remote operation terminal 3. Each of the remote operation terminals 3 includes the own robot current location information reception unit 80 configured to receive the current location information from the corresponding remote operation robot 2, the own robot current location information transmission unit 81 configured to transmit the current location information received by the own robot current location information reception unit 80 to another remote operation terminal 3, and the other robot current location information reception unit 82 configured to receive the current location information of the other robot from another remote operation terminal 3. The sound pressure information output unit 88 calculates the distance between the remote operation robots 2 that correspond to the respective users talking to each other based on the current location information of the own robot received by the own robot current location information reception unit 80 and the current location information of the other robot received by the other robot current location information reception unit 82 while the conversation control unit 89 is executing the inter-terminal conversation mode, and decreases the amplification rate of the sound pressure information when the sound pressure information is output as the calculated distance becomes longer. According to the aforementioned configuration, it is possible to provide a realistic user experience.

While some of the embodiments of the present disclosure have been described above, the above embodiments may be changed as follows.

When, for example, a voice quality evaluation unit configured to evaluate the quality of the voice in the inter-robot conversation mode is provided in the remote sightseeing system 1 and the evaluation value obtained by the voice quality evaluation unit is equal to or smaller than a predetermined value, the conversation mode executed by the conversation control units 89 of the plurality of remote operation terminals 3 that compose the remote sightseeing system 1 may be automatically switched from the inter-robot conversation mode to the inter-terminal conversation mode.

When a voice quality evaluation unit configured to evaluate the quality of the voice in the inter-robot conversation mode is provided in the remote sightseeing system 1 and the evaluation value obtained by the voice quality evaluation unit is equal to or smaller than a predetermined value, it may be proposed to the user to switch the conversation mode executed by the conversation control units 89 of the plurality of remote operation terminals 3 that compose the remote sightseeing system 1 from the inter-robot conversation mode to the inter-terminal conversation mode via the display 52 of at least one of the remote operation terminals 3.

When the plurality of remote operation robots 2 that compose the remote sightseeing system 1 are located in a predetermined range, the conversation mode executed by the conversation control units 89 of the plurality of remote operation terminals 3 that compose the remote sightseeing system 1 may be automatically switched from the inter-robot conversation mode to the inter-terminal conversation mode.

When the plurality of remote operation robots 2 that compose the remote sightseeing system 1 are located in a predetermined range, it may be proposed to the user to switch the conversation mode executed by the conversation control units 89 of the plurality of remote operation terminals 3 that compose the remote sightseeing system 1 from the inter-robot conversation mode to the inter-terminal conversation mode via the display 52 of at least one of the remote operation terminals 3.

The present disclosure can be applied to all the situations where multiple robots that perform tasks under remote control are present in the same environment and have a conversation with each other. Therefore, the present disclosure can be applied to a home robot, a medical care robot, and a logistics robot.

The home robot is, for example, a telepresence robot that is used when paternal and maternal grandparents celebrate the birthday of their mutual grandchild.

The medical care robot is a remote control robot used by a medical staff who visits the homes of elderly people who live alone but have family members taking care of them using remote control robots.

The logistics robot, which is a robot remotely controlled, hands out and receives commodities.

(Supplementary Note 1)

A remote operation system in which a plurality of users who are present in locations away from each other remotely operate a plurality of respective remote operation mobile bodies that are located in one place by operating respective remote operation terminals that the plurality of users have, the remote operation system comprising:

the plurality of remote operation mobile bodies; and
the plurality of remote operation terminals, wherein
each of the remote operation mobile bodies comprises:
  a control command reception unit configured to receive a control command from the corresponding remote operation terminal;
  an operation control unit configured to control the operation of the own remote operation mobile body based on the control command;
  an imaging unit;
  a captured image information acquisition unit configured to acquire captured image information from the imaging unit;
  a captured image information transmission unit configured to transmit the captured image information to the corresponding remote operation terminal;
  a mobile-body-side microphone;
  a mobile-body-side sound pressure information acquisition unit configured to acquire sound pressure information from the mobile-body-side microphone;
  a mobile-body-side sound pressure information transmission unit configured to transmit the sound pressure information acquired by the mobile-body-side sound pressure information acquisition unit to the corresponding remote operation terminal;

a mobile-body-side sound pressure information reception unit configured to receive sound pressure information from the corresponding remote operation terminal; and a mobile-body-side output unit configured to output the sound pressure information received by the mobile-body-side sound pressure information reception unit, and each of the remote operation terminals comprises:

a control command input unit configured to accept an operation of inputting the control command;

a control command transmission unit configured to transmit the control command to the corresponding remote operation mobile body;

a captured image information reception unit configured to receive the captured image information from the corresponding remote operation mobile body;

a captured image information display unit configured to display the captured image information;

a terminal-side microphone;

a terminal-side sound pressure information acquisition unit configured to acquire sound pressure information from the terminal-side microphone;

a first-terminal-side sound pressure information transmission unit configured to transmit the sound pressure information acquired by the terminal-side sound pressure information acquisition unit to the corresponding remote operation mobile body;

a first-terminal-side sound pressure information reception unit configured to receive sound pressure information from the corresponding remote operation mobile body;

a second-terminal-side sound pressure information transmission unit configured to transmit the sound pressure information acquired by the terminal-side sound pressure information acquisition unit to another remote operation terminal;

a second-terminal-side sound pressure information reception unit configured to receive sound pressure information from another remote operation terminal;

a terminal-side output unit configured to output the sound pressure information received by the first-terminal-side sound pressure information reception unit or the second-terminal-side sound pressure information reception unit; and a conversation control unit configured to execute an inter-mobile-body conversation mode that establishes conversation with another user using the first-terminal-side sound pressure information transmission unit and the first-terminal-side sound pressure information reception unit and an inter-terminal conversation mode that establishes conversation with another user using the second-terminal-side sound pressure information transmission unit and the second-terminal-side sound pressure information reception unit in such a way that they can be switched.

(Supplementary Note 2)

The remote operation system according to Supplementary Note 1, wherein each of the remote operation mobile bodies further comprises:

an own body identification information storage unit configured to store body identification information of the own remote operation mobile body;

a current location information acquisition unit configured to acquire current location information of the own remote operation mobile body;

an identification location information transmission unit configured to transmit identification location information including the body identification information and the current location information to another remote operation mobile body;

an another body identification information storage unit configured to store body identification information of a remote operation mobile body of a user who has a relation with the user who corresponds to the own remote operation mobile body;

an identification location information reception unit configured to receive the identification location information from another remote operation mobile body;

a related mobile body presence information generation unit configured to generate related mobile body presence information indicating that the remote operation mobile body of the user who has a relation with the user who corresponds to the own remote operation mobile body is close to the own remote operation mobile body based on the body identification information stored in the other body identification information storage unit, the identification location information received by the identification location information reception unit, and the current location information acquired by the current location information acquisition unit; and a related mobile body presence information transmission unit configured to transmit the related mobile body presence information to the corresponding remote operation terminal, and each of the remote operation terminals comprises:

a related mobile body presence information reception unit configured to receive the related mobile body presence information from the corresponding remote operation mobile body; and a related mobile body presence information display unit configured to display the related mobile body presence information.

(Supplementary Note 3)

The remote operation system according to Supplementary Note 1 or 2, wherein each of the remote operation terminals further comprises:

an inter-terminal conversation request transmission unit configured to transmit an inter-terminal conversation request to another remote operation terminal;

an inter-terminal conversation request reception unit configured to receive an inter-terminal conversation request from another remote operation terminal; and an inter-terminal conversation request approval unit configured to accept an operation of approving the inter-terminal conversation request received from another remote operation terminal, and the conversation control unit of each of the remote operation terminals executes the inter-terminal conversation mode in place of the inter-mobile-body conversation mode after the inter-terminal conversation request is approved.

(Supplementary Note 4)

The remote operation system according to Supplementary Note 3, wherein each of the remote operation terminals further comprises:

a conversation partner selection unit configured to accept an operation of selecting at least one remote operation mobile body from at least one remote operation mobile body shown in the captured image information displayed by the captured image information display unit, and the inter-terminal conversation request transmission unit transmits the inter-terminal conversation request to the remote operation terminal that corresponds to the at least one remote operation mobile body that has been selected.

(Supplementary Note 5)

The remote operation system according to Supplementary Note 3 or 4, wherein the operation control unit controls the operation of the own remote operation mobile body in such a way that the own remote operation mobile body moves following the remote operation mobile body that corresponds to the remote operation terminal that has transmitted the inter-terminal conversation request while the conversation control unit of the corresponding remote operation terminal is executing the inter-terminal conversation mode.

(Supplementary Note 6)

The remote operation system according to Supplementary Note 1, wherein each of the remote operation mobile bodies comprises:
- a current location information acquisition unit configured to acquire current location information of the own remote operation mobile body; and
- a current location information transmission unit configured to transmit the current location information to the corresponding remote operation terminal, each of the remote operation terminals comprises:
- an own body current location information reception unit configured to receive the current location information from the corresponding remote operation mobile body;
- an own body current location information transmission unit configured to transmit the current location information received by the own body current location information reception unit to another remote operation terminal; and
- an another body current location information reception unit configured to receive current location information of another remote operation mobile body from the other remote operation terminal, and the terminal-side output unit calculates the distance between remote operation mobile bodies that correspond to the respective users talking to each other based on the current location information of the own remote operation mobile body received by the own body current location information reception unit and the current location information of the other remote operation mobile body received by the other body current location information reception unit while the conversation control unit is executing the inter-terminal conversation mode, and decreases an amplification rate of the sound pressure information when the sound pressure information is output as the calculated distance becomes longer.

(Supplementary Note 7)

A remote operation method in which a plurality of users who are present in locations away from each other remotely operate a plurality of respective remote operation mobile bodies that are located in one place by operating respective remote operation terminal, wherein each of the remote operation mobile bodies receives a control command from the corresponding remote operation terminal, each of the remote operation mobile bodies controls the operation of the own remote operation mobile body based on the control command, each of the remote operation mobile bodies acquires captured image information from an imaging unit, each of the remote operation mobile bodies transmits the captured image information to the corresponding remote operation terminal, each of the remote operation mobile bodies acquires sound pressure information from a mobile-body-side microphone, each of the remote operation mobile bodies transmits the acquired sound pressure information to the corresponding remote operation terminal, each of the remote operation mobile bodies receives sound pressure information from the corresponding remote operation terminal, each of the remote operation mobile bodies outputs the received sound pressure information, each of the remote operation terminals accepts an operation of inputting the control command, each of the remote operation terminals transmits the control command to the corresponding remote operation mobile body, each of the remote operation terminals receives the captured image information from the corresponding remote operation mobile body, each of the remote operation terminals displays the captured image information, each of the remote operation terminals acquires sound pressure information from a terminal-side microphone, each of the remote operation terminals transmits the acquired sound pressure information to the corresponding remote operation mobile body, each of the remote operation terminals receives sound pressure information from the corresponding remote operation mobile body, each of the remote operation terminals transmits the acquired sound pressure information to another remote operation terminal, each of the remote operation terminals receives sound pressure information from another remote operation terminal, each of the remote operation terminals outputs the received sound pressure information, and each of the remote operation terminals executes an inter-mobile-body conversation mode in which conversation with another user is established by transmitting the acquired sound pressure information to the corresponding remote operation mobile body and receiving sound pressure information from the corresponding remote operation mobile body, and an inter-terminal conversation mode in which conversation with another user is established by transmitting the acquired sound pressure information to another remote operation terminal and receiving sound pressure information from another remote operation terminal in such a way that the modes can be switched.

(Supplementary Note 8)

The remote operation method according to Supplementary Note 7, wherein each of the remote operation mobile bodies stores body identification information of the own remote operation mobile body, each of the remote operation mobile bodies acquires current location information of the own remote operation mobile body, each of the remote operation mobile bodies transmits identification location information including the body identification information and the current location information to another remote operation mobile body, each of the remote operation mobile bodies stores body identification information of a remote operation mobile body of a user who has a relation with the user who corresponds to the own remote operation mobile body, each of the remote operation mobile bodies receives the identification location information from another remote operation mobile body, each of the remote operation mobile bodies generates related mobile body presence information indicating that a remote operation mobile body of a user who has a relation with the user who corresponds to the own remote operation mobile body is close to the own remote operation mobile body based on the body identification information stored in the other body identification information storage unit, the identification location information received by the identification location information reception unit, and the current location information acquired by the current location information acquisition unit, each of the remote operation mobile bodies transmits the related mobile body presence information to the corresponding remote operation terminal, each of the remote operation terminals receives the related mobile body presence information from the corresponding remote operation mobile body, and each of the remote operation terminals displays the related mobile body presence information.

(Supplementary Note 9)

The remote operation method according to Supplementary Note 7 or 8, wherein each of the remote operation terminals transmits an inter-terminal conversation request to another remote operation terminal, each of the remote operation terminals receives an inter-terminal conversation request from another remote operation terminal, each of the remote operation terminals accepts an operation of approving the inter-terminal conversation request received from another remote operation terminal, and each of the remote operation terminals executes the inter-terminal conversation mode in place of the inter-mobile-body conversation mode after the inter-terminal conversation request is approved.

(Supplementary Note 10)

The remote operation method according to Supplementary Note 9, wherein each of the remote operation terminals accepts an operation of selecting at least one remote operation mobile body from at least one remote operation mobile body shown in the captured image information displayed by the captured image information display unit, and each of the remote operation terminals transmits the inter-terminal conversation request to a remote operation terminal that corresponds to the at least one remote operation mobile body that has been selected.

(Supplementary Note 11)

The remote operation method according to Supplementary Note 9 or 10, wherein each of the remote operation mobile bodies controls the operation of the own remote operation mobile body in such a way that the own remote operation mobile body moves following the remote operation mobile body that corresponds to the remote operation terminal that has transmitted the inter-terminal conversation request while the corresponding remote operation terminal is executing the inter-terminal conversation mode.

(Supplementary Note 12)

The remote operation method according to Supplementary Note 7, wherein each of the remote operation mobile bodies acquires current location information of the own remote operation mobile body, each of the remote operation mobile bodies transmits the current location information to the corresponding remote operation terminal, each of the remote operation terminals receives the current location information from the corresponding remote operation mobile body, each of the remote operation terminals transmits the received current location information to another remote operation terminal, each of the remote operation terminals receives current location information of another remote operation mobile body from the other remote operation terminal, and each of the remote operation terminals calculates the distance between remote operation mobile bodies that correspond to the respective users talking to each other based on the received current location information of the own remote operation mobile body and the received current location information of the other remote operation mobile body while the inter-terminal conversation mode is being executed, and decreases the amplification rate of the sound pressure information when the sound pressure information is output as the calculated distance becomes longer.

(Supplementary Note 13)

A program for causing a computer to execute the remote operation method according to any one of Supplementary Notes 7 to 12.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A remote operation system in which a plurality of users who are present in locations away from each other remotely operate a plurality of respective remote operation mobile bodies that are located in one place by operating respective remote operation terminals that the plurality of users have, the remote operation system comprising:

the plurality of remote operation mobile bodies; and
the plurality of remote operation terminals, wherein
each of the remote operation mobile bodies comprises:
- a control command reception unit configured to receive a control command from the corresponding remote operation terminal;
- an operation control unit configured to control the operation of the own remote operation mobile body based on the control command;
- an imaging unit;
- a captured image information acquisition unit configured to acquire captured image information from the imaging unit;
- a captured image information transmission unit configured to transmit the captured image information to the corresponding remote operation terminal;
- a mobile-body-side microphone;
- a mobile-body-side sound pressure information acquisition unit configured to acquire sound pressure information from the mobile-body-side microphone;
- a mobile-body-side sound pressure information transmission unit configured to transmit the sound pressure information acquired by the mobile-body-side sound pressure information acquisition unit to the corresponding remote operation terminal;
- a mobile-body-side sound pressure information reception unit configured to receive sound pressure information from the corresponding remote operation terminal; and
- a mobile-body-side output unit configured to output the sound pressure information received by the mobile-body-side sound pressure information reception unit, and each of the remote operation terminals comprises:
- a control command input unit configured to accept an operation of inputting the control command;
- a control command transmission unit configured to transmit the control command to the corresponding remote operation mobile body;
- a captured image information reception unit configured to receive the captured image information from the corresponding remote operation mobile body;
- a captured image information display unit configured to display the captured image information;
- a terminal-side microphone;
- a terminal-side sound pressure information acquisition unit configured to acquire sound pressure information from the terminal-side microphone;
- a first-terminal-side sound pressure information transmission unit configured to transmit the sound pressure information acquired by the terminal-side sound pressure information acquisition unit to the corresponding remote operation mobile body;
- a first-terminal-side sound pressure information reception unit configured to receive sound pressure information from the corresponding remote operation mobile body;
- a second-terminal-side sound pressure information transmission unit configured to transmit the sound pressure information acquired by the terminal-side sound pressure information acquisition unit to another remote operation terminal;
- a second-terminal-side sound pressure information reception unit configured to receive sound pressure information from another remote operation terminal;
- a terminal-side output unit configured to output the sound pressure information received by the first-terminal-side sound pressure information reception unit or the second-terminal-side sound pressure information reception unit; and
- a conversation control unit configured to execute an inter-mobile-body conversation mode that establishes conversation with another user using the first-terminal-side sound pressure information transmission unit and the first-terminal-side sound pressure information reception unit and an inter-terminal conversation mode that establishes conversation with another user using the second-terminal-side sound pressure information transmission unit and the second-terminal-side sound pressure information reception unit in such a way that they can be switched, wherein each of the remote operation mobile bodies further comprises:
- an own body identification information storage unit configured to store body identification information of the own remote operation mobile body;
- a current location information acquisition unit configured to acquire current location information of the own remote operation mobile body;
- an identification location information transmission unit configured to transmit identification location information including the body identification information and the current location information to another remote operation mobile body;
- an another body identification information storage unit configured to store body identification information of a remote operation mobile body of a user who has a relation with the user who corresponds to the own remote operation mobile body;
- an identification location information reception unit configured to receive the identification location information from another remote operation mobile body;
- a related mobile body presence information generation unit configured to generate related mobile body presence information indicating that the remote operation mobile body of the user who has a relation with the user who corresponds to the own remote operation mobile body is close to the own remote operation mobile body based on the body identification information stored in the other body identification information storage unit, the identification location information received by the identification location information reception unit, and the current location information acquired by the current location information acquisition unit; and
- a related mobile body presence information transmission unit configured to transmit the related mobile body presence information to the corresponding remote operation terminal, and each of the remote operation terminals comprises:
- a related mobile body presence information reception unit configured to receive the related mobile body presence information from the corresponding remote operation mobile body; and
- a related mobile body presence information display unit configured to display the related mobile body presence information.

2. A remote operation system in which a plurality of users who are present in locations away from each other remotely operate a plurality of respective remote operation mobile bodies that are located in one place by operating respective remote operation terminals that the plurality of users have, the remove operation system comprising:

the plurality of remote operation mobile bodies; and
the plurality of remote operation terminals, wherein
each of the remote operation mobile bodies comprises:
- a control command reception unit configured to receive a control command from the corresponding remote operation terminal;
- an operation control unit configured to control the operation of the own remote operation mobile body based on the control command;
- an imaging unit;
- a captured image information acquisition unit configured to acquire captured image information from the imaging unit;
- a captured image information transmission unit configured to transmit the captured image information to the corresponding remote operation terminal;
- a mobile-body-side microphone;
- a mobile-body-side sound pressure information acquisition unit configured to acquire sound pressure information from the mobile-body-side microphone;
- a mobile-body-side sound pressure information transmission unit configured to transmit the sound pressure information acquired by the mobile-body-side sound pressure information acquisition unit to the corresponding remote operation terminal;
- a mobile-body-side sound pressure information reception unit configured to receive sound pressure information from the corresponding remote operation terminal; and
- a mobile-body-side output unit configured to output the sound pressure information received by the mobile-body-side sound pressure information reception unit, and each of the remote operation terminals comprises:
- a control command input unit configured to accept an operation of inputting the control command;
- a control command transmission unit configured to transmit the control command to the corresponding remote operation mobile body;
- a captured image information reception unit configured to receive the captured image information from the corresponding remote operation mobile body;
- a captured image information display unit configured to display the captured image information;
- a terminal-side microphone;
- a terminal-side sound pressure information acquisition unit configured to acquire sound pressure information from the terminal-side microphone;
- a first-terminal-side sound pressure information transmission unit configured to transmit the sound pressure information acquired by the terminal-side sound pressure information acquisition unit to the corresponding remote operation mobile body;
- a first-terminal-side sound pressure information reception unit configured to receive sound pressure information from the corresponding remote operation mobile body;
- a second-terminal-side sound pressure information transmission unit configured to transmit the sound pressure information acquired by the terminal-side sound pressure information acquisition unit to another remote operation terminal;
- a second-terminal-side sound pressure information reception unit configured to receive sound pressure information from another remote operation terminal;
- a terminal-side output unit configured to output the sound pressure information received by the first-terminal-side sound pressure information reception unit or the second-terminal-side sound pressure information reception unit; and
- a conversation control unit configured to execute an inter-mobile-body conversation mode that establishes conversation with another user using the first-terminal-side sound pressure information transmission unit and the first-terminal-side sound pressure information reception unit and an inter-terminal conversation mode that establishes conversation with another user using the second-terminal-side sound pressure information transmission unit and the second-terminal-side sound pressure information reception unit in such a way that they can be switched, wherein each of the remote operation terminals further comprises:
- an inter-terminal conversation request transmission unit configured to transmit an inter-terminal conversation request to another remote operation terminal;
- an inter-terminal conversation request reception unit configured to receive an inter-terminal conversation request from another remote operation terminal; and
- an inter-terminal conversation request approval unit configured to accept an operation of approving the inter-terminal conversation request received from another remote operation terminal, and the conversation control unit of each of the remote operation terminals executes the inter-terminal conversation mode in place of the inter-mobile-body conversation mode after the inter-terminal conversation request is approved.

3. The remote operation system according to claim 2, wherein each of the remote operation terminals further comprises:
- a conversation partner selection unit configured to accept an operation of selecting at least one remote operation mobile body from at least one remote operation mobile body shown in the captured image information displayed by the captured image information display unit, and the inter-terminal conversation request transmission unit transmits the inter-terminal conversation request to the remote operation terminal that corresponds to the at least one remote operation mobile body that has been selected.

4. The remote operation system according to claim 2, wherein the operation control unit controls the operation of the own remote operation mobile body in such a way that the own remote operation mobile body moves following the remote operation mobile body that corresponds to the remote operation terminal that has transmitted the inter-terminal conversation request while the conversation control unit of the corresponding remote operation terminal is executing the inter-terminal conversation mode.

5. A remote operation system in which a plurality of users who are present in locations away from each other remotely operate a plurality of respective remote operation mobile bodies that are located in one place by operating respective remote operation terminals that the plurality of users have, the remove operation system comprising:

the plurality of remote operation mobile bodies; and
the plurality of remote operation terminals, wherein
each of the remote operation mobile bodies comprises:
- a control command reception unit configured to receive a control command from the corresponding remote operation terminal;
- an operation control unit configured to control the operation of the own remote operation mobile body based on the control command;
- an imaging unit;
- a captured image information acquisition unit configured to acquire captured image information from the imaging unit;
- a captured image information transmission unit configured to transmit the captured image information to the corresponding remote operation terminal;
- a mobile-body-side microphone;
- a mobile-body-side sound pressure information acquisition unit configured to acquire sound pressure information from the mobile-body-side microphone;
- a mobile-body-side sound pressure information transmission unit configured to transmit the sound pressure information acquired by the mobile-body-side sound pressure information acquisition unit to the corresponding remote operation terminal;
- a mobile-body-side sound pressure information reception unit configured to receive sound pressure information from the corresponding remote operation terminal; and
- a mobile-body-side output unit configured to output the sound pressure information received by the mobile-body-side sound pressure information reception unit, and each of the remote operation terminals comprises:
- a control command input unit configured to accept an operation of inputting the control command;
- a control command transmission unit configured to transmit the control command to the corresponding remote operation mobile body;
- a captured image information reception unit configured to receive the captured image information from the corresponding remote operation mobile body;
- a captured image information display unit configured to display the captured image information;
- a terminal-side microphone;
- a terminal-side sound pressure information acquisition unit configured to acquire sound pressure information from the terminal-side microphone;
- a first-terminal-side sound pressure information transmission unit configured to transmit the sound pressure information acquired by the terminal-side sound pressure information acquisition unit to the corresponding remote operation mobile body;
- a first-terminal-side sound pressure information reception unit configured to receive sound pressure information from the corresponding remote operation mobile body;
- a second-terminal-side sound pressure information transmission unit configured to transmit the sound pressure information acquired by the terminal-side sound pressure information acquisition unit to another remote operation terminal;
- a second-terminal-side sound pressure information reception unit configured to receive sound pressure information from another remote operation terminal;
- a terminal-side output unit configured to output the sound pressure information received by the first-terminal-side sound pressure information reception unit or the second-terminal-side sound pressure information reception unit; and
- a conversation control unit configured to execute an inter-mobile-body conversation mode that establishes conversation with another user using the first-terminal-side sound pressure information transmission unit and the first-terminal-side sound pressure information reception unit and an inter-terminal conversation mode that establishes conversation with another user using the second-terminal-side sound pressure information transmission unit and the second-terminal-side sound pressure information reception unit in such a way that they can be switched, wherein each of the remote operation mobile bodies comprises:
- a current location information acquisition unit configured to acquire current location information of the own remote operation mobile body; and
- a current location information transmission unit configured to transmit the current location information to the corresponding remote operation terminal, each of the remote operation terminals comprises:
- an own body current location information reception unit configured to receive the current location information from the corresponding remote operation mobile body;
- an own body current location information transmission unit configured to transmit the current location information received by the own body current location information reception unit to another remote operation terminal; and
- an another body current location information reception unit configured to receive current location information of another remote operation mobile body from the other remote operation terminal, and the terminal-side output unit calculates the distance between remote operation mobile bodies that correspond to the respective users talking to each other based on the current location information of the own remote operation mobile body received by the own body current location information reception unit and the current location information of the other remote operation mobile body received by the other body current location information reception unit while the conversation control unit is executing the inter-terminal conversation mode, and decreases an amplification rate of the sound pressure information when the sound pressure information is output as the calculated distance becomes longer.

* * * * *